(12) United States Patent
Tollefson

(10) Patent No.: US 7,861,562 B2
(45) Date of Patent: Jan. 4, 2011

(54) VEHICLE MOUNTABLE PERSONAL PROPERTY SECUREMENT DEVICE

(75) Inventor: Dale Anton Tollefson, Brush Prairie, WA (US)

(73) Assignee: Peak Recreational Products, LLC, Brush Prairie, WA (US)

( * ) Notice: Subject to any disclaimer, the term of this patent is extended or adjusted under 35 U.S.C. 154(b) by 0 days.

(21) Appl. No.: 12/240,717

(22) Filed: Sep. 29, 2008

(65) Prior Publication Data

US 2009/0014574 A1 Jan. 15, 2009

Related U.S. Application Data

(63) Continuation of application No. 11/020,964, filed on Dec. 22, 2004, now Pat. No. 7,428,833.

(51) Int. Cl.
*E05B 67/06* (2006.01)

(52) U.S. Cl. .................. 70/49; 70/58; 70/233; 70/14

(58) Field of Classification Search .................. 70/14, 70/30, 49, 58, 233
See application file for complete search history.

(56) References Cited

U.S. PATENT DOCUMENTS

| | | | |
|---|---|---|---|
| 2,440,744 A | 5/1948 | Grinnell et al. | |
| 3,605,458 A | 9/1971 | Best | |
| 3,728,879 A | 4/1973 | Best | |
| 3,841,118 A | 10/1974 | Stone | |
| 3,879,721 A | 4/1975 | Yereance | |
| 3,922,897 A | 12/1975 | Mickelson | |
| 3,950,972 A | 4/1976 | Bleier et al. | |
| 3,982,413 A | 9/1976 | Stone et al. | |
| 3,987,653 A | 10/1976 | Lyon et al. | |
| 4,044,577 A | 8/1977 | Horlacher | |
| 4,086,795 A | 5/1978 | Foster et al. | |
| 4,098,099 A | 7/1978 | Smith | |
| 4,141,233 A | 2/1979 | Reyes | |
| 4,404,822 A | 9/1983 | Green | |
| 4,502,305 A | 3/1985 | Bakker | |
| 4,620,718 A | 11/1986 | Mickelson | |
| 4,665,724 A | 5/1987 | Sakai | |
| 4,693,098 A | 9/1987 | Davis et al. | |
| 4,760,719 A | 8/1988 | Evans et al. | |
| 4,845,967 A | 7/1989 | Evans et al. | |
| 4,896,517 A * | 1/1990 | Ling | 70/18 |
| 5,052,203 A | 10/1991 | Van Cuyk | |
| 5,136,863 A | 8/1992 | Richardson | |

(Continued)

FOREIGN PATENT DOCUMENTS

NL 8300-423 A 9/1984

*Primary Examiner*—Suzanne D Barrett
(74) *Attorney, Agent, or Firm*—Walter D. Fields; patenttm.us

(57) ABSTRACT

A vehicle mountable personal property securement device includes a plurality of walls that device a housing with an aperture. A real is operably disposed in the housing for spring-biased rotation. A cable is threaded through the aperture of the housing and includes a first end that is secured to the reel. The second end of the cable is disposed external the housing and is terminated by a head of dimension greater than a diameter of the aperture. A ratchet is disposed in operable configuration in cooperation with the reel to enable ratcheted rotation of the reel in a first direction during cable extraction and further operable at periodic intervals of rotation to enable reversal of wheel rotation.

14 Claims, 27 Drawing Sheets

U.S. PATENT DOCUMENTS

| | | |
|---|---|---|
| 5,181,405 A | 1/1993 | Wheeler |
| 5,255,545 A | 10/1993 | Wheeler |
| 5,531,083 A | 7/1996 | Franck, III et al. |
| 5,572,821 A | 11/1996 | Coleman |
| 5,598,727 A | 2/1997 | White |
| D381,254 S | 7/1997 | Collins |
| 5,669,571 A | 9/1997 | Graybill |
| 5,768,920 A | 6/1998 | DeBevoise |
| 5,786,759 A | 7/1998 | Ling |
| D414,675 S | 10/1999 | Niswanger |
| 5,960,652 A | 10/1999 | Marmstad |
| 6,024,372 A | 2/2000 | Colibert et al. |
| D434,965 S | 12/2000 | Ling |
| D435,428 S | 12/2000 | Ling |
| 6,161,402 A | 12/2000 | Moore |
| D436,015 S | 1/2001 | Yu |
| 6,192,720 B1 | 2/2001 | Kan |
| 6,212,710 B1 | 4/2001 | Jones |
| 6,227,016 B1 | 5/2001 | Yu |
| D450,560 S | 11/2001 | Yu |
| 6,352,277 B1 | 3/2002 | Timmings |
| 6,389,854 B1 | 5/2002 | Huang |
| D460,341 S | 7/2002 | Ling |
| 6,418,766 B1 | 7/2002 | Luebeck |
| 6,481,250 B1 | 11/2002 | Kuo |
| 6,540,246 B2 | 4/2003 | Andersen et al. |
| 6,581,420 B1 | 6/2003 | Ling et al. |
| 6,588,239 B1 | 7/2003 | Johansson |
| 6,588,638 B1 | 7/2003 | Luebeck et al. |
| 6,609,399 B1 | 8/2003 | Daniels, Jr. |
| 6,619,980 B1 | 9/2003 | Hsiao |
| 6,761,050 B2 | 7/2004 | Rosenberg |
| 6,848,282 B2 | 2/2005 | Palzkill et al. |
| 6,909,046 B2 | 6/2005 | Laity et al. |
| 6,971,660 B1 | 12/2005 | Putnam |
| 7,000,746 B2 | 2/2006 | Mackin et al. |
| 7,108,544 B2 | 9/2006 | Zoller |
| 7,428,833 B2 * | 9/2008 | Tollefson .................. 70/49 |
| 7,523,629 B2 * | 4/2009 | Tollefson .................. 70/49 |
| 2002/0170324 A1 | 11/2002 | Wilson |
| 2004/0083776 A1 | 5/2004 | Rosenberg |
| 2006/0112739 A1 | 6/2006 | Hogesta |
| 2007/0063483 A1 | 3/2007 | Thomsen |
| 2008/0236209 A1 * | 10/2008 | Conti et al. ............ 70/18 |
| 2008/0314094 A1 * | 12/2008 | Shu ........................ 70/30 |

* cited by examiner

VEHICLE MOUNTABLE PERSONAL PROPERTY SECUREMENT DEVICE

This is a continuation of U.S. patent application Ser. No. 11/020,964, filed on Dec. 22, 2004, now U.S. Pat. No. 7,428,833, which is hereby incorporated by reference in its entirety.

BACKGROUND

The present disclosure relates to locks and, more particularly, to vehicle mountable personal property lock assemblies.

Cable locks may be used to secure various types of personal property. For example, some cable locks may be used to secure a bicycle to a bicycle rack. Other cable locks may be used to secure, e.g., a notebook computer to a person, to a table, or to another object. Yet other cable locks may be used to secure other types of personal property (e.g., ATV, motorcycle, bicycle, camping gear, etc.).

Both a cable lock and the personal property being locked may be lightweight. Therefore, it may be desirable in some circumstances to anchor a cable lock to a large, heavy, and/or immovable object. Such an object may comprise, e.g., a bicycle rack, a post, a person, etc. A desirable characteristic of such an object may be the difficulty a thief may encounter in trying to move the object, perhaps because of the object's size or weight.

At times it may be desirable to travel to various locations with personal property and a cable lock. However, some visited locations may not have a suitable object to which the cable lock and personal property may be secured.

Cable locks may often be used for a specific type of personal property (e.g., a bicycle cable lock, a notebook computer cable lock, etc.). A cable lock's weight, diameter, and/or length may be related to its intended use. For example, a rather short, thin, and/or lightweight cable lock may be used to secure a laptop computer to a person. A considerably longer and heavier cable lock may be used to secure a kayak to a tree or a bicycle to a bicycle rack.

In some circumstances, it may be desirable to use a cable lock to secure more than a single piece of personal property. In such cases, an important characteristic of a cable lock may be whether it has sufficient length to secure a plurality of items of personal property. However, a cable with excessive length may be cumbersome to use or carry.

In modern society, people and their possessions have become more mobile. Vehicles such as automobiles, trucks, trailers, and fifth-wheel trailers have become commonplace. As people travel, whether to parks, campsites, or on extended road trips, they may desire various means of securing their personal property. Cable locks may be one such means of securing such personal property.

SUMMARY

According to an embodiment of the present invention, a personal property lock assembly may comprise a cable lockbox and a coupler operable to secure the lockbox to a vehicle. The coupler may comprise a seating surface to seat on a plateaued surface of the lockbox and a locking mechanism operable to secure the coupler's mounting to the vehicle.

In a further embodiment, the lockbox may comprise a flexible cable retrievably stored within the lockbox, which may be retrievably withdrawn from the lockbox, passed through or wound about personal property and then fastened to a cable receiving mechanism of the lockbox. In use, the first end of the cable may be fixed to a cable reel operable to retractably wind and store a length of the cable. A second end of the cable may be terminated with a cable retention knob or a mating head, which may be kept outside the lockbox per a diameter greater than an exit port of the lockbox through which the cable is threaded. A butt-end of the retention knob or mating head may be defined with a narrowing taper of an angle operable to seat with non-binding engagement within a tapered opening defined by the exit port. When interacting with a locking mechanism associated with a receiving port of the housing, the retention knob on the second end of the cable may be captured by the locking mechanism.

In another embodiment, the second end of the cable may be terminated with a mating head that may define an elongated slot passing therethrough of width sufficient to allow insertion of an arm of a padlock.

As referenced in this disclosure, various embodiments of the coupler may be distinguished by different descriptors. In one embodiment, the coupler may be described as a C-clip coupler that may be fastened to a flange of an I-beam or a C-beam associated with a vehicle chassis. In another embodiment, it may be described as a receiver mount coupler that may be inserted and fastened to a receiver hitch of a vehicle. In yet another embodiment, it may be described as a fifth-wheel mount coupler that may be shaped to slot a flared end to a lock pole associated with a fifth wheel trailer. In still yet another embodiment, it may be described as a ball-hitch coupler that may be coupled to a ball-receiving unit to a trailer hitch.

BRIEF DESCRIPTION OF THE DRAWINGS

The subject matter of embodiments of the present invention may be understood by reference to the following detailed description and with reference to the accompanying drawings, in which.

DETAILED DESCRIPTION

Figure 1A:
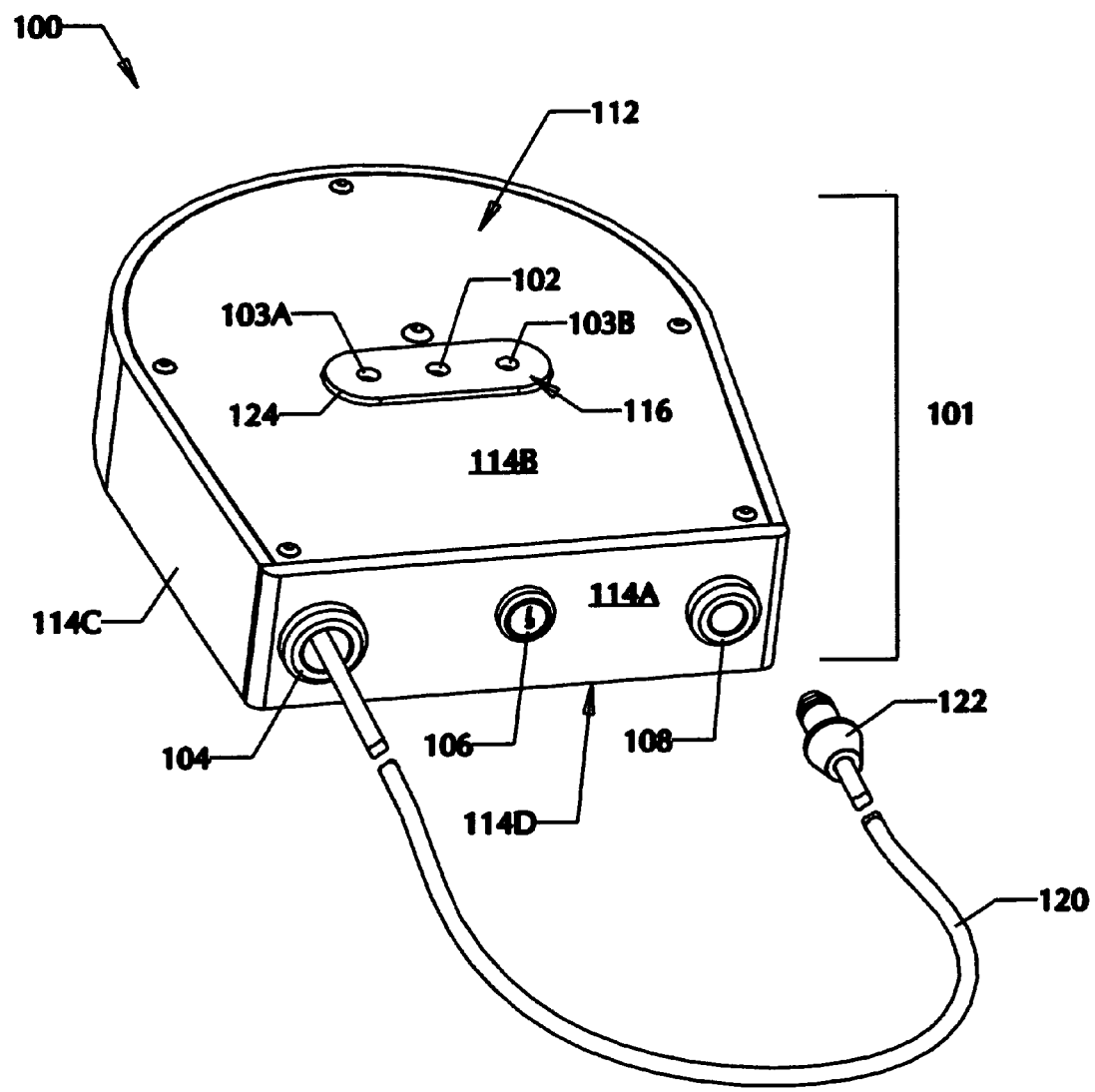
FIG. 1A is a simplified perspective drawing of a personal property lock assembly (e.g., a lockbox), consistent with some embodiments of the present invention, showing the lockbox with a plateaued surface for mounting to a coupler and a cable to secure personal property.

While the invention is amenable to various modifications and alternative forms, specifics of particular embodiments have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

In the description that follows, readily established structures for the exemplary embodiments may be disclosed in simplified form (e.g., simplified housing, lock pins and/or simplified description) to avoid obscuring an understanding of the embodiments with excess detail and where persons of ordinary skill in this art can readily understand their structure and formation by way of the drawings and disclosure. For the same reason, identical components may be given the same reference numerals, regardless of whether they are shown in different embodiments of the invention.

The term "vehicle" is used herein in its broad sense and, depending upon context, may refer to all types of vehicles including, without limitation, automobiles, trucks, travel trailers, fifth-wheel trailers, utility trailers, tractors, etc.

In a given application and consistent with one embodiment of the present invention, a cable lock box may be anchored by way of a coupler to a vehicle for use in securing one or more items of personal property. A retractable cable of the cable lockbox may be pulled and extended from the lockbox, passed through passages of the personal items, and then locked appropriately upon itself or to a locking member or latch of the cable lockbox. Given that the vehicles may be defined by a variety of different features and/or hitching configurations, various embodiments may be described for the coupler that is to bind the lockbox to the vehicle.

As referenced in this disclosure, various embodiments of the coupler may be distinguished by different descriptors. In one embodiment, referencing FIGS. 5A-B and 6A-C, the coupler may be described as a C-clip coupler. In another embodiment, referencing FIGS. 7A-B and 8A-C, it may be described as a receiver mount coupler. For another embodiment, referencing FIGS. 9A-B and 10A-C, it may be described as a fifth-wheel mount coupler; and, in yet another embodiment referenced by FIGS. 11A-B and 12A-C, it may be described as a ball-hitch coupler. Each of these types of couplers may be effective for binding the cable lockbox to respective vehicles, which may also be disclosed with alternative embodiments.

Cable lock 100 may comprise a housing 101 defined by walls 114A-114D, the inside surfaces of which may define an inner chamber 180. Inner housing 180 may house a reel assembly 171 operably attached to at least one inner surface or between two opposing of walls 114B, 114D. Reel assembly 171 may be rotationally operable to store and/or allow retractable extension of a length of cable 120. Referencing FIGS. 1B and 1D, cable 120 may have a first end portion 126 anchored to reel assembly 171 and the second end portion that may be extended outside of housing 101 through exit orifice 104 defined in the faceplate or front wall 114A. In operation, the second end portion of cable 120 may be passed through or wound about personal property and then inserted into a cable receiving mechanism that may be integrated together in/on a wall for housing 101.

Figures 1B, 1C:
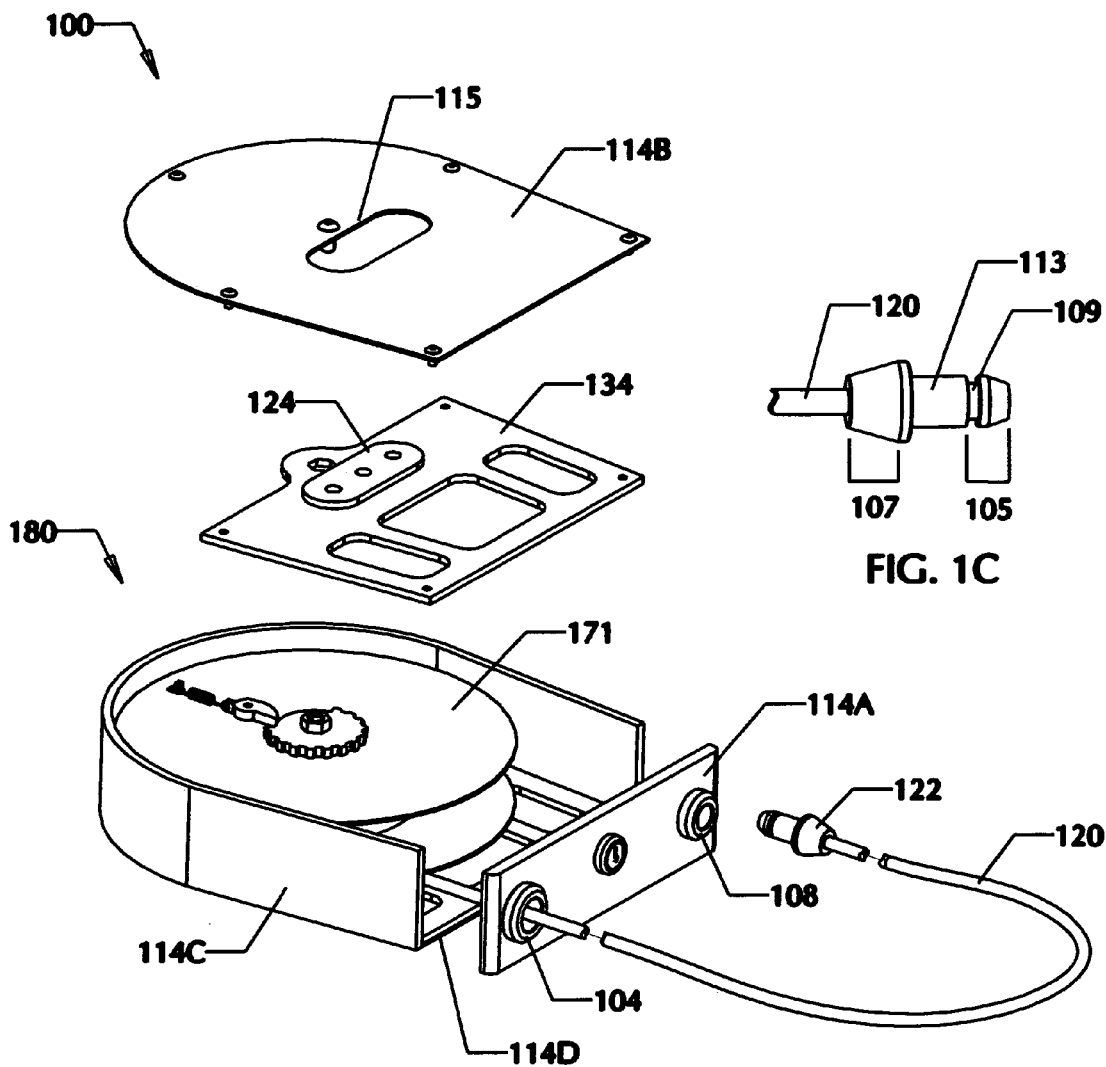
FIG. 1B is a simplified exploded assembly view showing a portion of an interior assembly of the lockbox of FIG. 1A, and showing a top plate, an intermediate plate with a protrusion, a cable reel within a bottom assembly, and a face plate with a cable extending therethrough.
FIG. 1C is a simplified perspective view of a cable retention knob in accordance with an embodiment of the present invention.
Figure 1D:
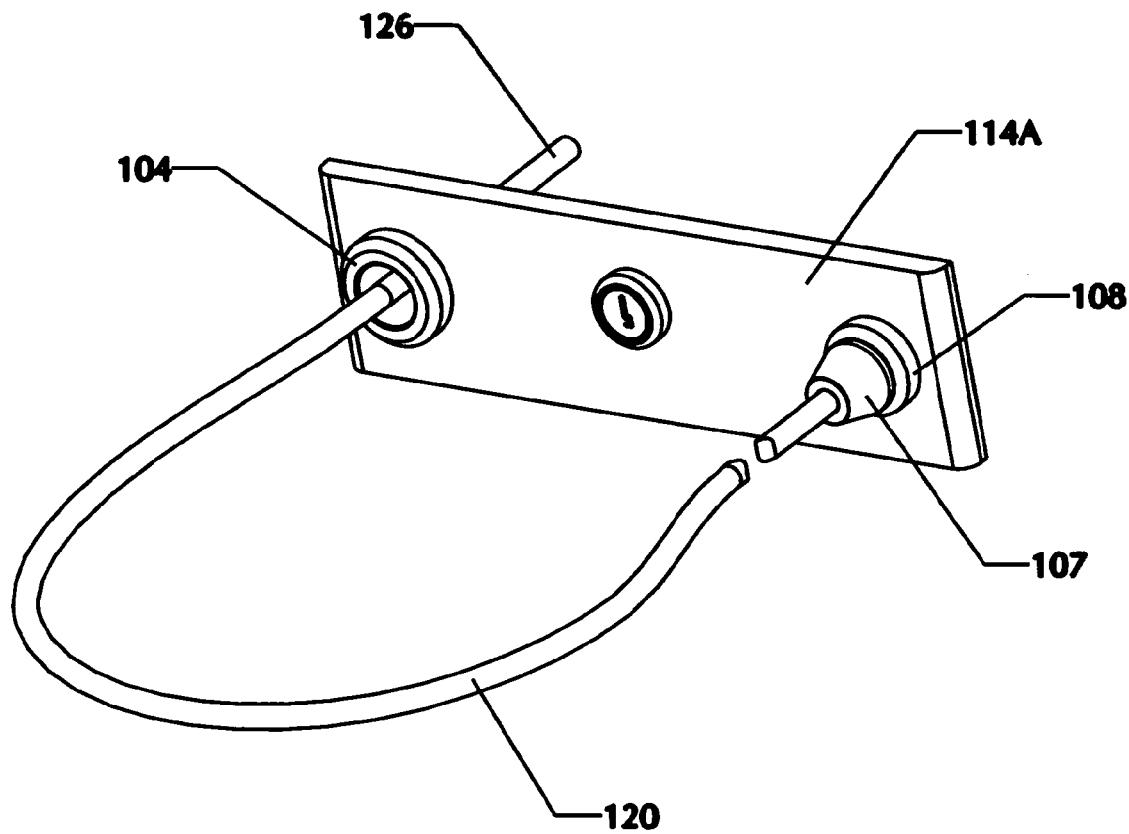
FIG. 1D is a simplified perspective view showing the cable retention knob of FIG. 1C operable to interact with a cable receiving mechanism of the lockbox of FIG. 1A, according to an embodiment of the present invention.
Figure 2A:
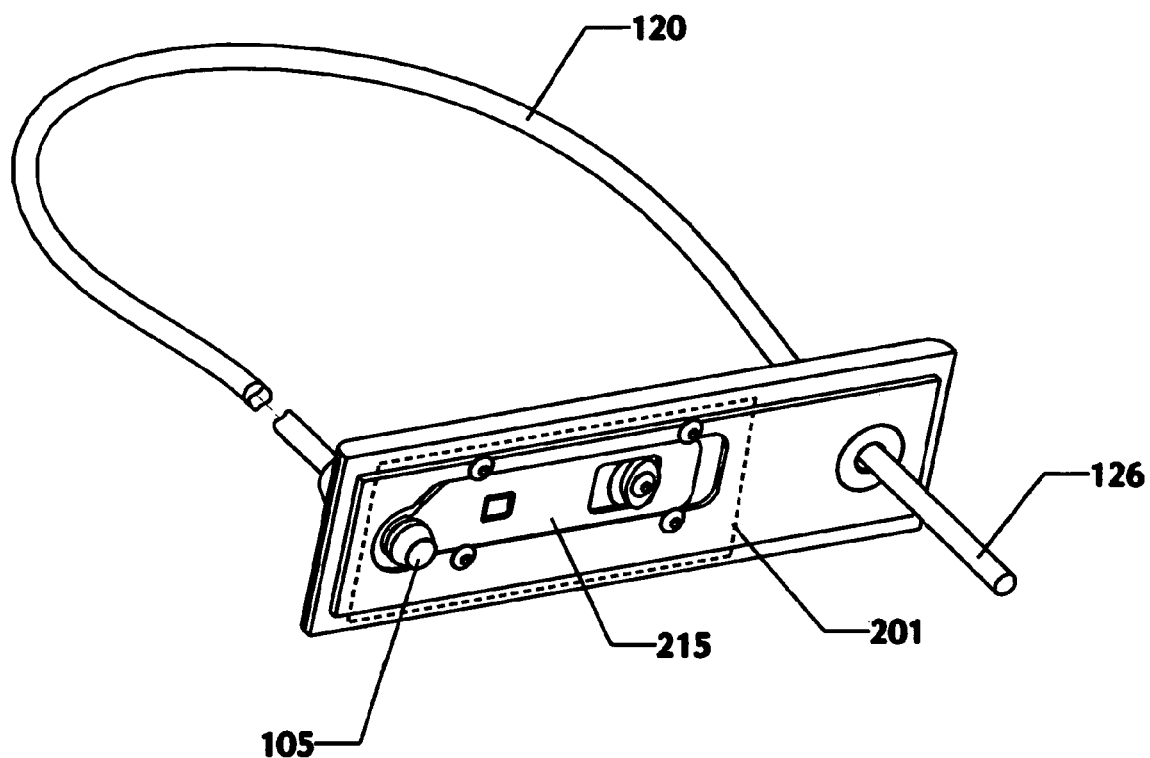
FIGS. 2A, 2B are perspective and assembly views of a face plate with a locking mechanism, in accordance with certain embodiments of the present invention, disposed with a front wall of the lockbox of FIG. 1A.
Figure 2B:
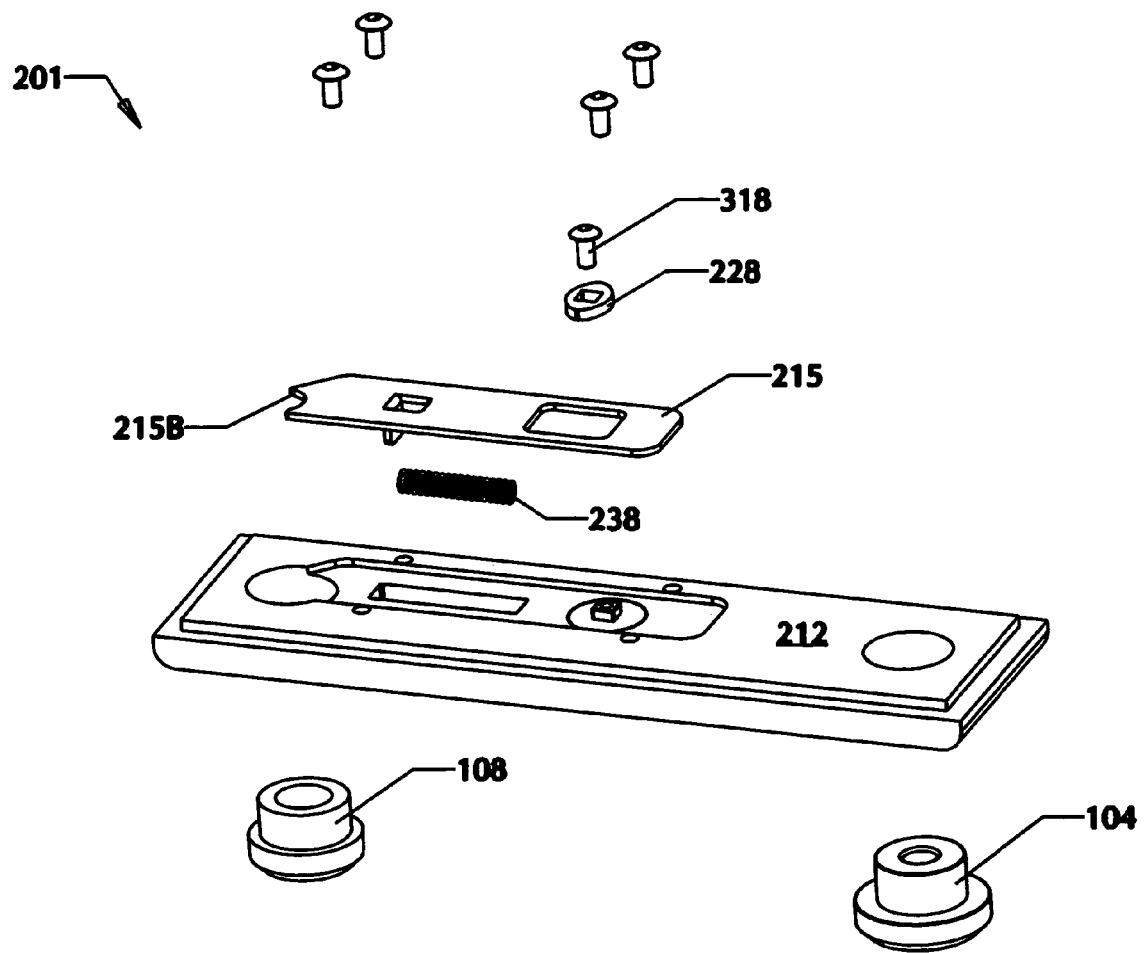

For example, referencing FIGS. 1A-1C, the second end of cable 120 may terminate with coupling to a cable retention knob 122 (e.g., tip, knob, phallic head, securing pin, locking head, keyed plug, etc.). In accordance with one embodiment, the cable retention knob 122, defined by a cylindrical shaft 113 between a butt-end 107 (e.g., tapered) and a distal end 105, may be shaped for seated insertion into cable receiving mechanism 108. The distal end may be shaped for plug insertion and capture within a receiving port of the cable receiving mechanism and a locking mechanism 201 (FIGS. 2A, 2B) of the front wall of the housing. Further referencing FIG. 1C, butt-end 107 of the cable retention knob may flare outwardly from the cable diameter toward that of its cylindrical shaft 103, the flare-out being angled to fit a tapered opening of cable receiving mechanism 108 for a non-binding engagement. That is, when the cable has been fully retracted for storage within the housing, the shoulder defined by the butt-end of the cable retention knob may be seated in non-binding engagement within the tapered passage defined by exit orifice 104.

Figure 3:
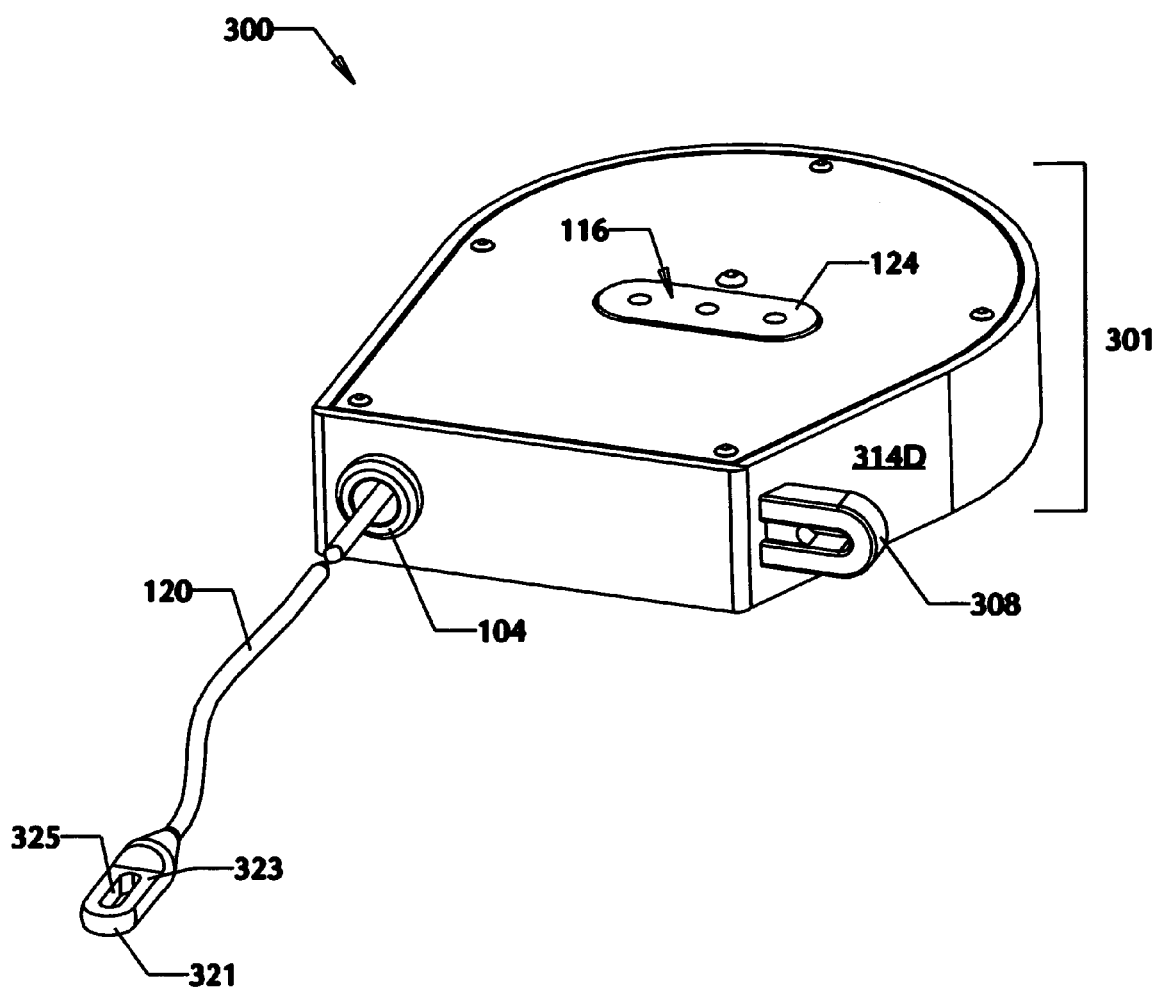
FIG. 3 is a simplified perspective drawing of another personal property lock assembly (e.g., a lockbox), consistent with certain embodiments of the present invention, showing a u-bar of the lockbox operable to receive and secure a mating head anchored to one end of a cable.

Continuing with reference to FIGS. 1A, 1B, 3, plateaued surface 116 may be defined by a surface of a protrusion 124 that may extend outwardly a wall 114B of the housing. In some embodiments, protrusion 124 and wall 114B may be a single unitary structure, e.g., a single casting or welded structure. In other embodiments, protrusion 124 and wall 114B may be removably affixed (FIG. 1B), wherein protrusion 124 may be disposed on a surface of an intermediate plate 134 for elevated placement through an opening 115 in the tope plate or wall 114B of the housing. Other relationships are possible,—protrusion 124 being part of a structure, e.g., rib, cross bar, etc., or may be associated with an internal frame or chassis of the lockbox assembly.

Further referencing FIGS. 1A-B and 3, the plateaued surface 116 of protrusion 124 may further define openings or tapped holes 102, 103A, 103B that may be operable to receive fastening pins or screws for assisting alignment and/or securement of the coupler thereto. During assembly, fastening pins or screws may align, by way of these holes, placement of a seating surface of a coupler relative to and against the plateaued surface of the protrusion of the lockbox.

Referencing FIGS. 1A-1D, 2A, 2B, in particular embodiments, lockbox 100 may further comprise locking mechanism 201 within or disposed with the front wall 114A of the housing. Aligned with the cable receiving port 108 as defined in the face plate or front wall 114A, the locking mechanism 201 may interact with the head of the cable retention knob 122 to enable latched capture thereof. Further, once inserted therein, the cable retention knob 122 may be locked within the capture of the locking mechanism until the locking mechanism is unlocked. In some embodiments, locking mechanism 201 may comprise a keyhole 106 through the exterior of faceplate 114A that may allow passage of a key of known operability for enabling rotational keyed operation of the lock assembly 201 (e.g., locking mechanism) between locked and unlocked states. Referencing FIG. 2B, locking mechanism 201 may comprise spring-biased sliding plate 215 (FIG. 2B) operable to latch a knob of lock cable retention knob 122 with the assistance of spring 238. That is, when a locked state is intended, the key may be positioned to a relaxed state and the sliding plate 215 may be biased with a force toward the receiving port 108. The latching end of the sliding plate may define an outline to a partial circumference or arc that may wrap a partial circumference of a knob of the cable retention knob. Under bias, the sliding plate may slide inwardly as the knob of the cable retention knob is inserted into the receiving port. But, once the knob is fully inserted into the receiving port, the latching end 215B of the biased sliding plate 215 may spring back into the coaxial recess log defined around the cable retention knob so as to capture the knob and lock the cable retention knob 122 in place. To unlock the cable retention knob 122, the key in the keyed slot 106 may be turned. Rotation of the keyed slot 106, in turn, may rotate cam 228 operable to slide the sliding plate 215 inwardly against the force of the biasing spring 238. Eventually, as the spring compresses under the force provided by the rotation of the keyed slot 106, the latching end 215B of the slide plate 215 may clear an outer circumference of the cable retention knob 122, wherein the knob may be released by the locking mechanism 201 and withdrawn from cable receiving port 108. In other embodiments, other cable receiving and/or locking mechanisms may be used to secure a mating head or a knob associated with cable 120.

For example, further referencing FIG. 3, lockbox 300 of another embodiment may comprise a cable receiving mechanism 308 (e.g., u-bar) mounted onto the exterior of wall 314D of the housing. In some embodiments, u-bar 308 and wall 314D may be made as a single unitary structure, e.g., during the casting or molding process for manufacture of walls for housing 301. Alternatively, u-bar 308 may be mounted onto wall 314D by at least one of the typical mounting methods such as welding and bolting. As a cable receiving mechanism, u-bar 308 may be shaped and positioned to operably receive mating head 322 of an alternative embodiment for cable termination. Thus, mating head 322 at the distal end of the cable may comprise an appropriate circumference that may pass through the passage defined by the u-bar 308 and the housing sidewall.

In a particular embodiment, mating head 322 may be locked to u-bar 308 by a locking mechanism, e.g., a lock (not shown) of any suitable type that may fit through some aligned passages defined by a mating head (e.g., slot, groove, etc.) of any suitable shape yet operable to prevent withdrawal of the mating head from the passages of the receiving mechanism. For example, a slot 325 may be defined into a tab section 323 of the mating head to align with corresponding passages in u-bar 308 to allow insertion of the lock therethrough for securement of mating head 322. In one embodiment, the tab may define a slot of width sufficient for receipt of a lock-arm/shank/etc.

In a further embodiment, the slot may be defined in the tab with a slot-width of at least as great as a diameter of the cable and further defined with an elongated length of at least as great as two times the diameter of the cable. Accordingly, a fold of the cable may be passed through the slot for a short cable loop. A pad lock might then be passed around a strand of the cable associated with defining the loop so as to prevent withdrawal of the loop from the slot.

Figure 4A:
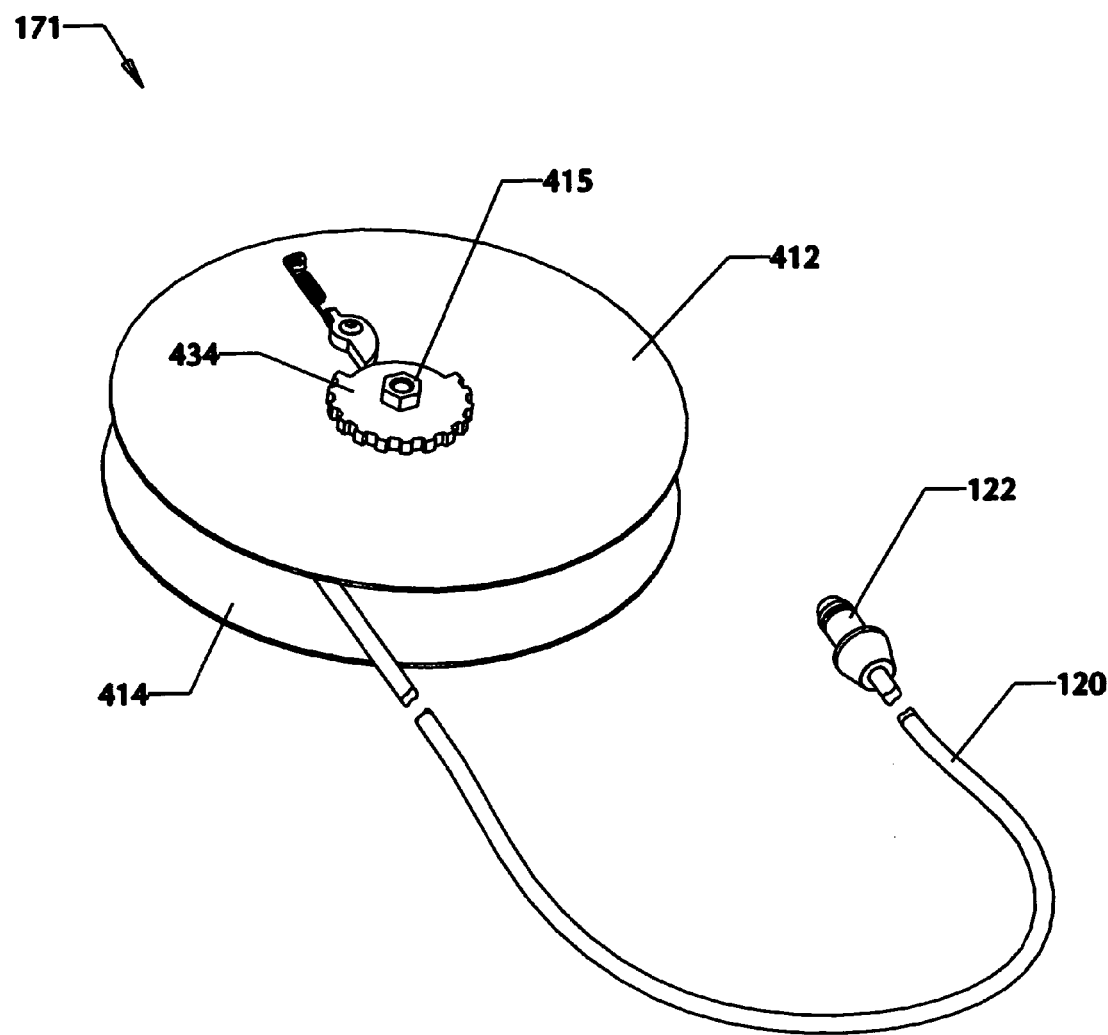
FIG. 4A is a perspective view of a cable reel that may be operatively coupled, consistent with some embodiments of the present invention, between interior walls of the lockbox of FIG. 1A, and showing the exterior of the reel and a cable wound around its inner core.
Figure 4B:
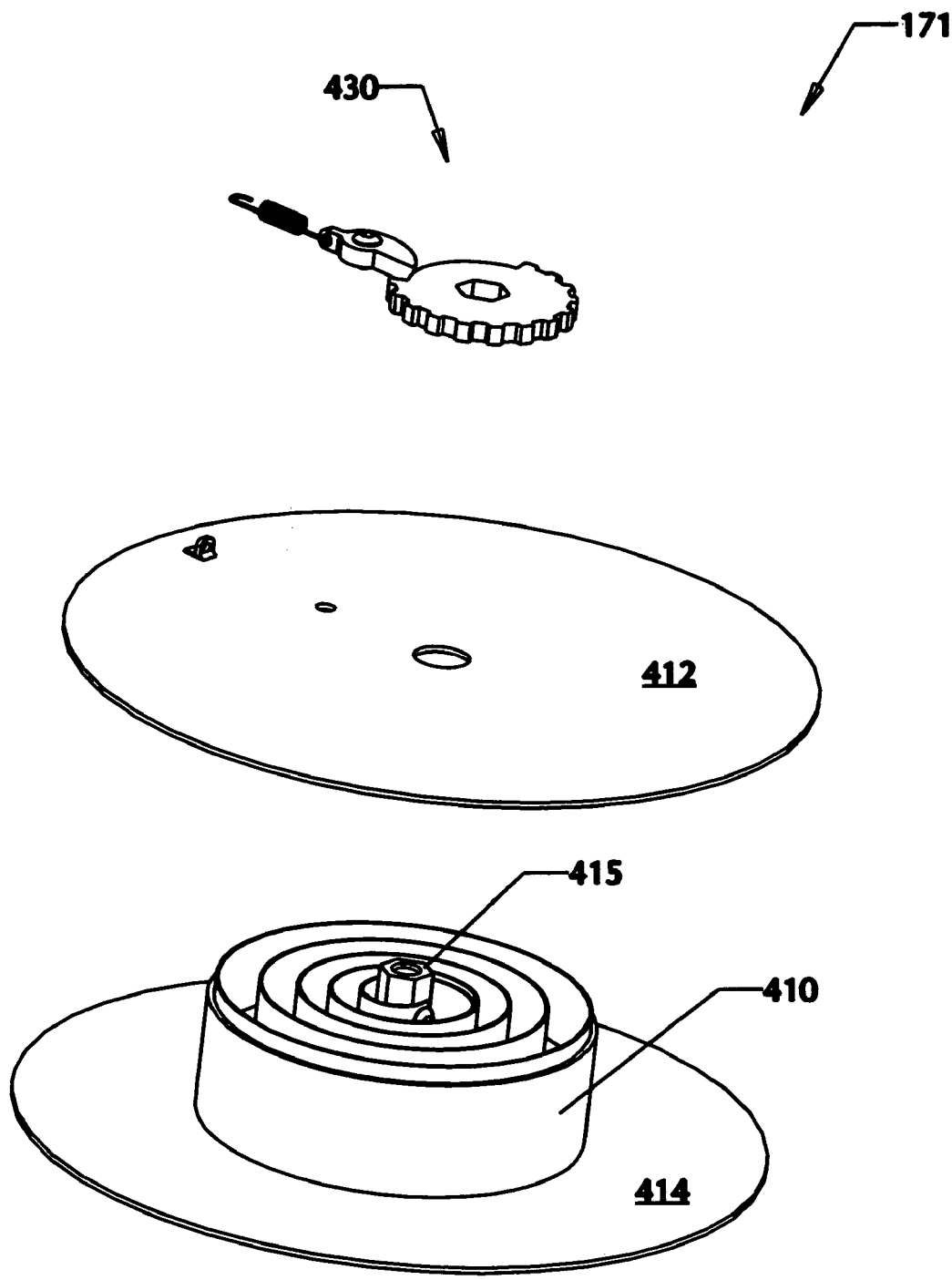
FIG. 4B is a perspective assembly view of a portion of the cable reel, showing a cable attachment mechanism that may form a portion of the reel, an inner coiling spring and a ratchet mechanism.
Figure 4C:
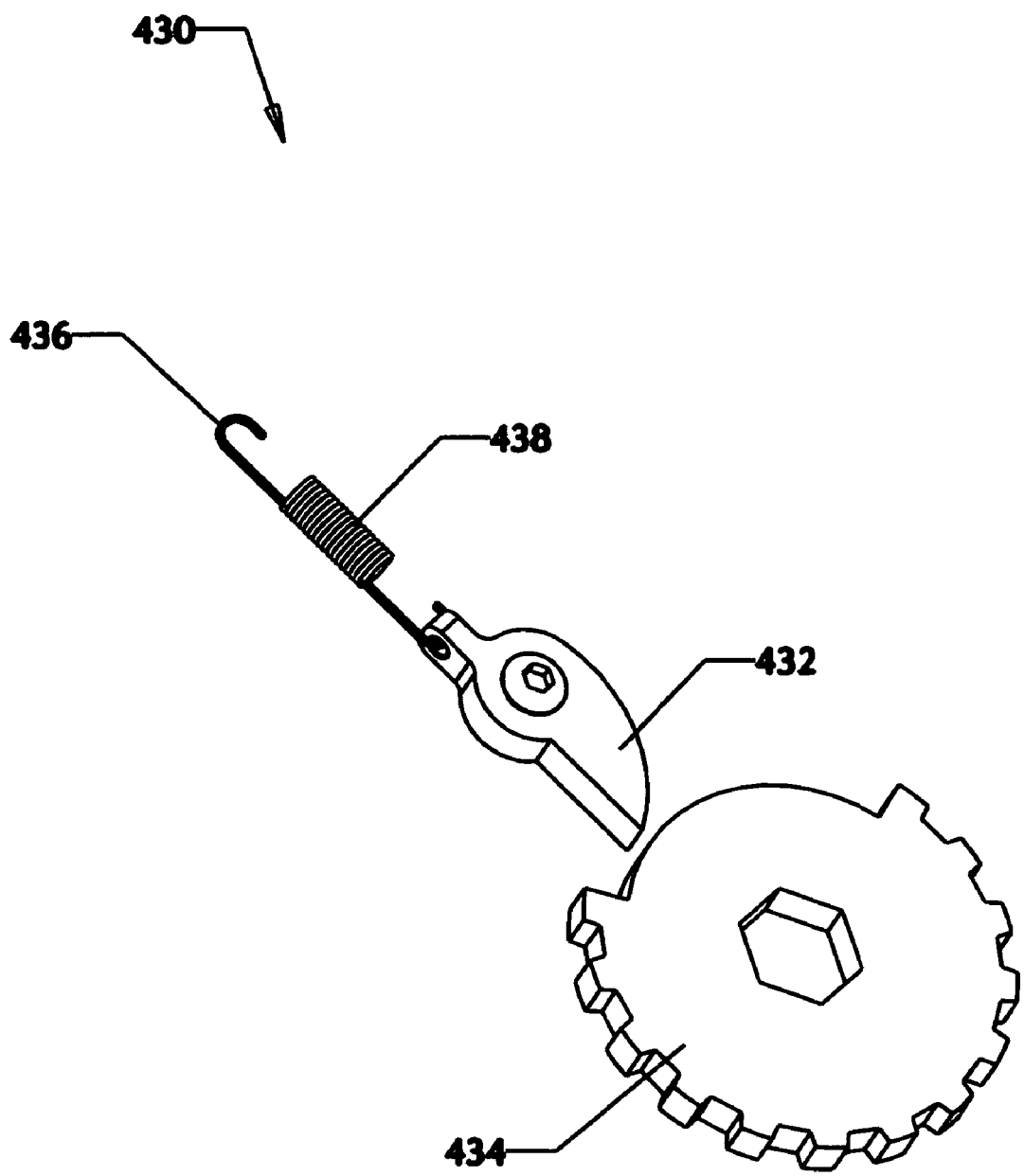
FIG. 4C is a more detailed perspective view of the cable ratchet mechanism that may form a portion of the reel assembly of FIG. 4A.
Figure 5A:
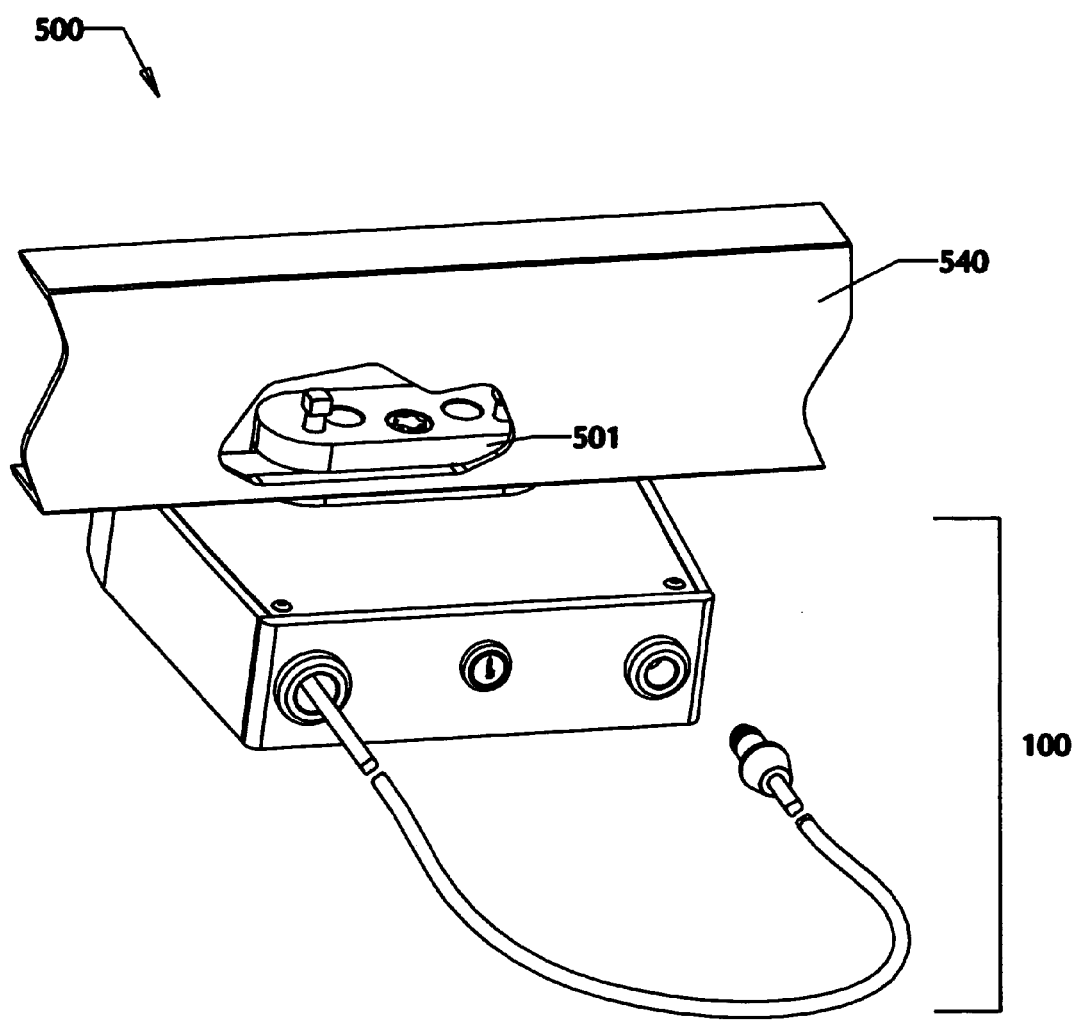
FIGS. 5A and 5B are perspective drawings of a c-shaped coupler operable to mount a lockbox to a flange of a c-channel beam of a vehicle, according to an embodiment of the present invention.
Figure 5B:
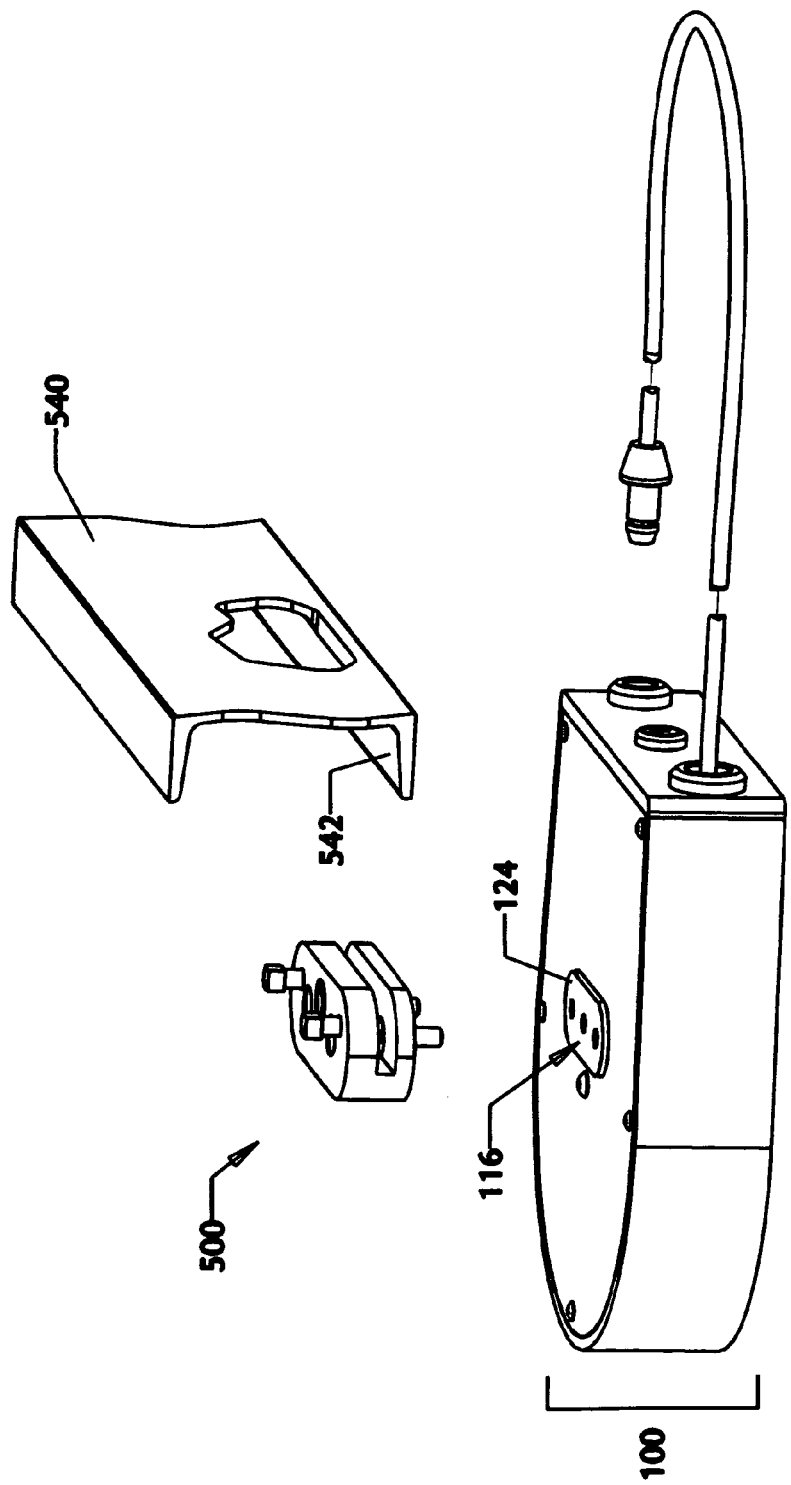

Continuing with reference to FIGS. 4A-4C, in some embodiments, lockbox 100/300 (FIG. 1A/3) may comprise a reel assembly 171 (FIG. 4A) operable to secure and/or store cable 120. Although reel assembly 171 may take many forms, in some particular embodiments with reference to FIGS. 4A-4C, reel assembly 171 may comprise upper member 412 and lower member 414 defining, e.g., circular plates, substantially parallel to each other. The upper and lower members may be operatively coupled by a rotary core 415 operable together with a power spring/clock-type spring 410 to allow retrievable winding, tensioned unwinding and/or storing of cable 120 about the circumference of the inner core.

Referencing FIG. 4B, in particular embodiments, upper member 412 may comprise a ratchet mechanism 430 operable to release tensioning of user-controlled lengths of cable 120 as pulled through exit aperture 104. And, upon advancing to a neutral release circumference of the spindle wheel, the ratchet lock may be released to allow spring-operated rotational coil or recovery of the cable length. For example, spindle 434 may rotate counterclockwise when cable 120 is pulled on, or it may rotate clockwise to retract cable 120 once its outer circumference reaches a neutral position enabling release of ratcheting lever 432. Further referencing FIG. 4C, ratchet mechanism may allow the extension of cable 120 in uniform increments. Ratcheting lever 432, being biased by spring 438, may engage each slot position about the circumference of ratchet spindle 434 and likewise may be operable to maintain a given user-defined length of cable 120. That is, it may prevent retraction of the cable except in desired extracted cable increments. Upon disengagement about the ratchet spindle 434, providing clearance to ratchet lever 432, the ratchet-clip toggles counterclockwise under influence of spring 438 so as to release the reel. Accordingly, the recoiling power spring within the reel 171 may then act to retract the cable for recovering the external length. Further referencing FIG. 4C, ratchet lever 432 and biasing spring 438 both may be realized in other forms as a component of cable ratchet 430, collectively operable to assist retractable cable extension from storage housing of the lockbox. In alternative embodiments, the cable ratchet mechanism might also be located elsewhere on the reel assembly.

Referencing FIGS. 5A-B and 6A-C, consistent with one embodiment for another lock assembly 500, C-shaped coupler 501 may be described as an elongated U-bar comprising upper 612 and lower 614 lips that extend laterally outward from a sidewall 615 in spaced, substantially parallel relationship. The spacing 641 between the opposing upper and lower lips 612, 614 may be defined by the vertical height of the sidewall 615 and with a magnitude sufficient to allow receipt of, e.g., a flange member 542 therebetween. In a particular embodiment, the flange may be associated with, e.g., a frame member 540 of a vehicle. In this fashion, the C-shaped coupler 501 may be operable to slide onto flange 542 with its upper and lower lips 612, 614, respectively, about a mounting portion of the flange.

For example, a tongue of a utility trailer,—e.g., boat, camping or hauling trailer—may be defined in part by I-beams or C-beams that may meet near an end associated with a hitching unit. The C-shaped coupler 501 of this embodiment may then be fastened to a flange of one of these beam members that is associated with the vehicle as though a clam clamped with its upper and lower shells against opposite sides of the flange.

Further referencing FIGS. 5A-6C, to assist fastening and securing the C-shaped coupler 501 of this embodiment to lockbox 100 and the flange member 540, respectively, various screws and bolts 618A, 618B, 644, 646A, 646B may be used in combination with various alignments and tapped holes 603A, 603B, 608A, 608B, 602A, 602B, 604A, 604B in the coupler, in the flange member, and in the lockbox. In this embodiment, screws 618A, 618B associated with securing the coupler to the lockbox may be described as fasteners, a bolt 644 to lock the coupler to the flange may be described as a locking mechanism, and bolts/screws 646A, 646B to frictionally bind and clamp the coupler to the flange may be described as friction fasteners.

In a particular assembly, the "C" of the c-shaped coupler 501 may be clipped around flange 542 of frame member 540. Referencing FIGS. 6A-6C, a locking mechanism, e.g., locking bolts 644 with a keyed head that may fit through aligned holes 602A, 602B of the coupler and through a predefined hole in flange 542. In one example, locking bolt 644 may thread into tapped hole 602B in the lower lip 614 of the c-shaped coupler 510. In a further embodiment, it may thread into a tapped hole (102, FIG. 1) of the locking box. The receipt of a portion of flange 542 may render inaccessible fasteners 618A, 618B that fasten seating surface of coupler 501 to plateaued surface 116 of the protrusion 124 of lockbox 100/300 (FIG. 1A/3). Additional friction fasteners/screws 646A, 646B may be threaded into holes 604A, 604B of the upper lip 612 of C-shaped coupler 501 for frictional or binding contact with the flange to prevent rotational or lateral movement of coupler 501 relative to flange 542.

In a further embodiment, further referencing FIGS. 5A-6C, the upper lip 612 of the coupler may define the upper hole 602A associated with the locking bolt 644 with a bored entry to a depth to define a recessed shoulder therefore (referencing the partial cut-away cross-sectional view of FIG. 6B) that may seat the lower surface of the keyed head for the bolt. Accordingly, when seated into the upper hole 602A, the head to the bolt may be recessed within the bored entry.

Figure 6A:
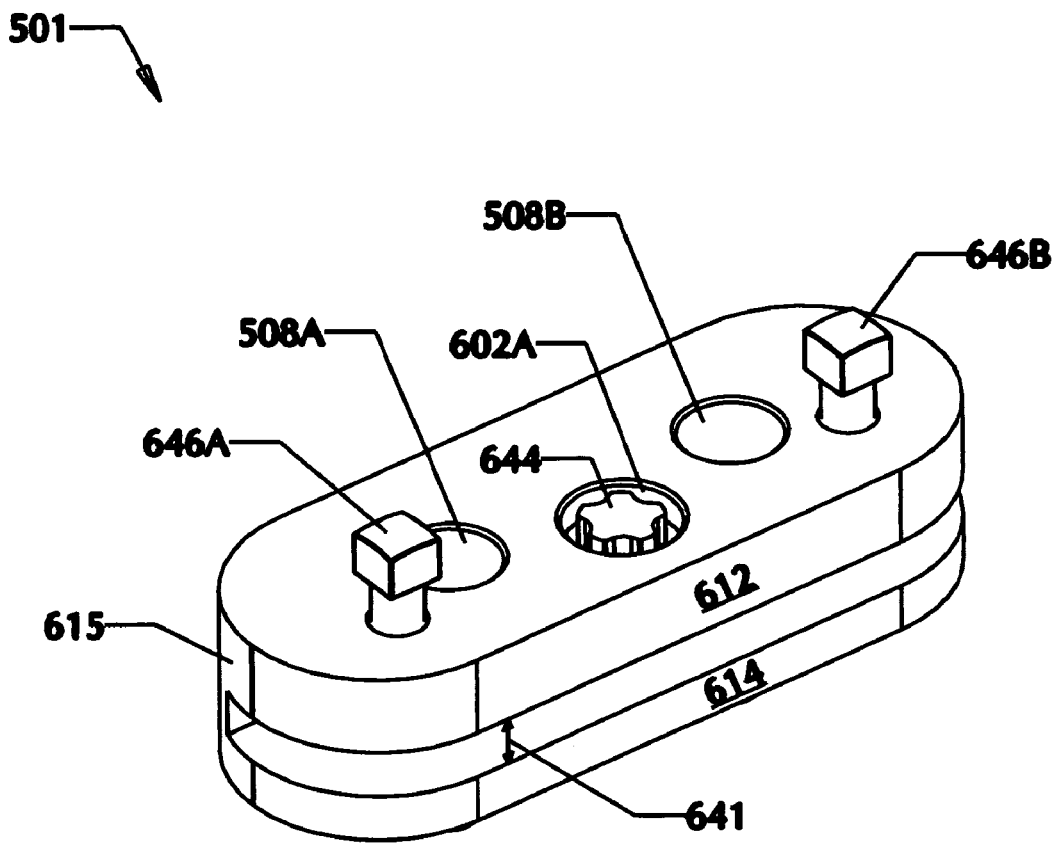
FIGS. 6A-6C are perspective, assembly and partial cutaway cross-sectional views of the c-shaped coupler, consistent with an embodiment of the present invention, showing provisions for a seating surface and a mounting mechanism.
Figure 6B:
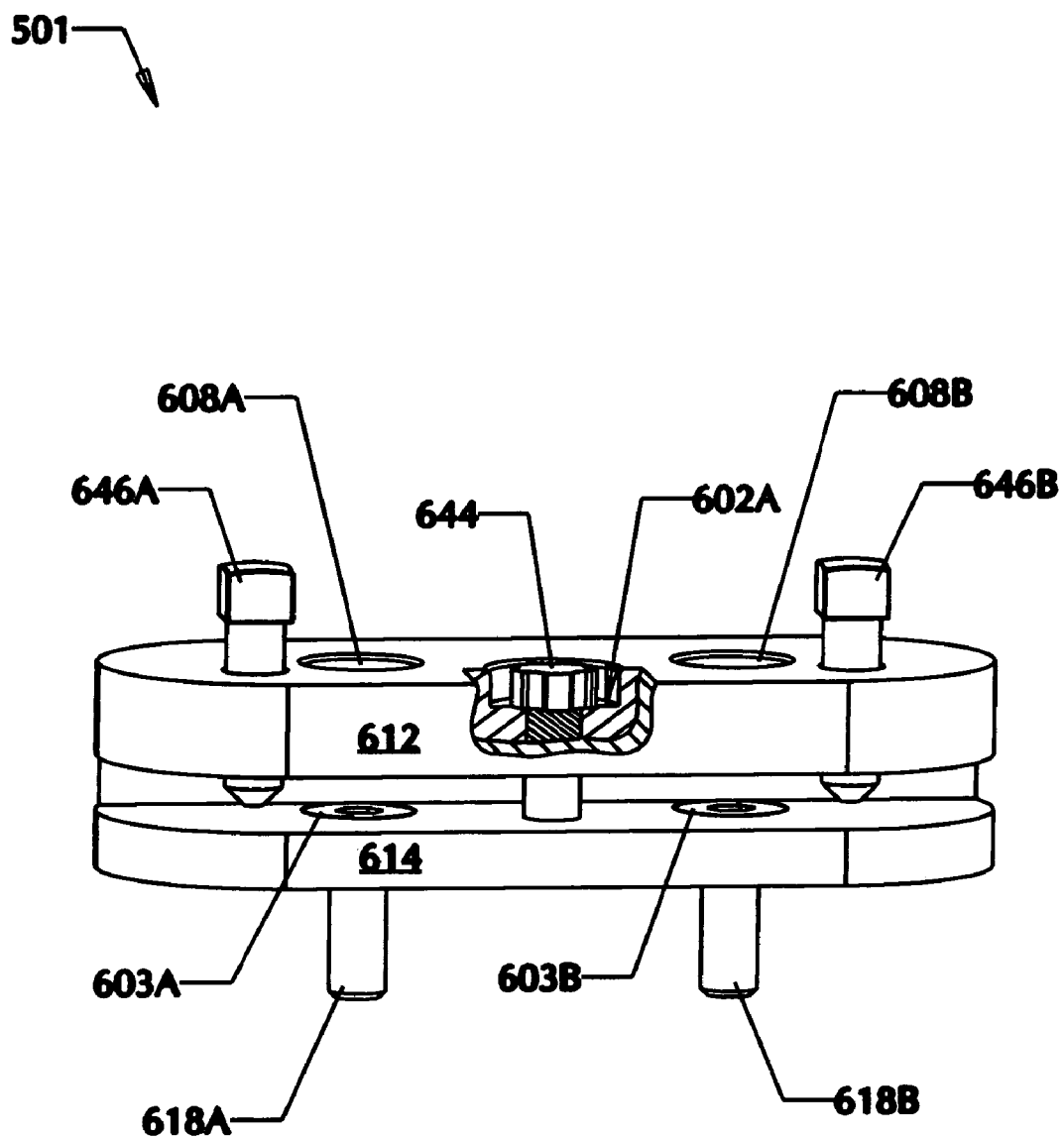
Figure 6C:
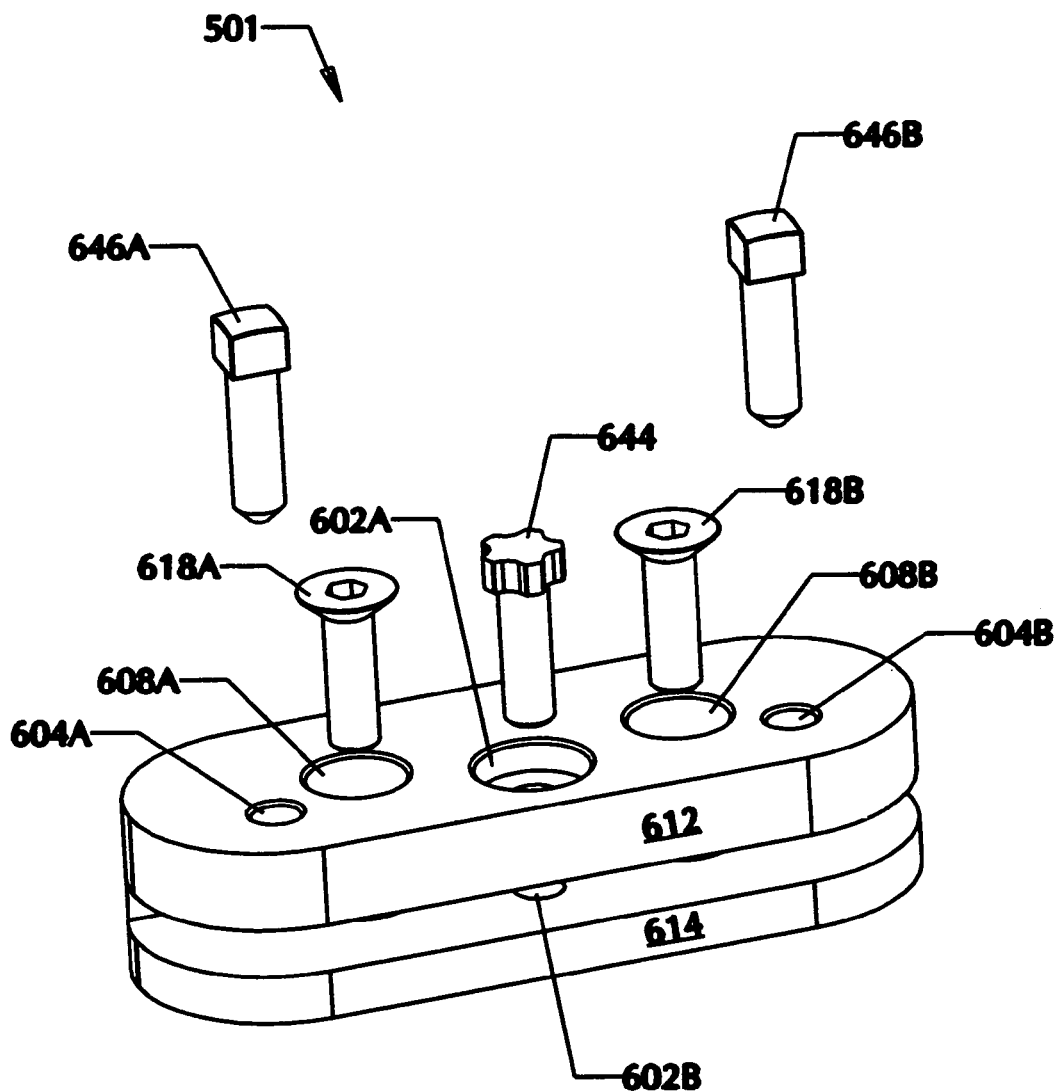
Figure 7A:
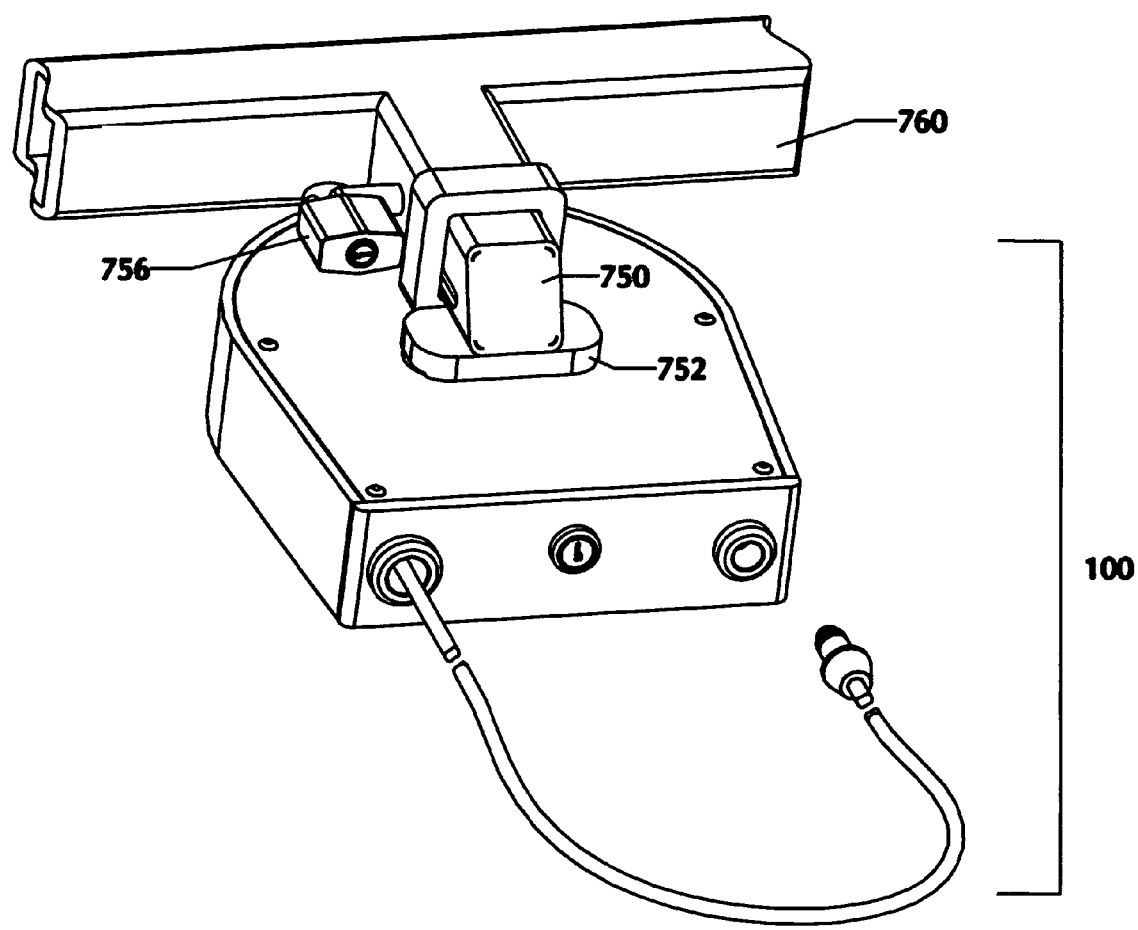
FIGS. 7A and 7B are simplified perspective and assembly views of another coupler, consistent with some embodiments of the present invention, operable to couple a lockbox to a receiver associated with a towing vehicle.
Figure 7B:
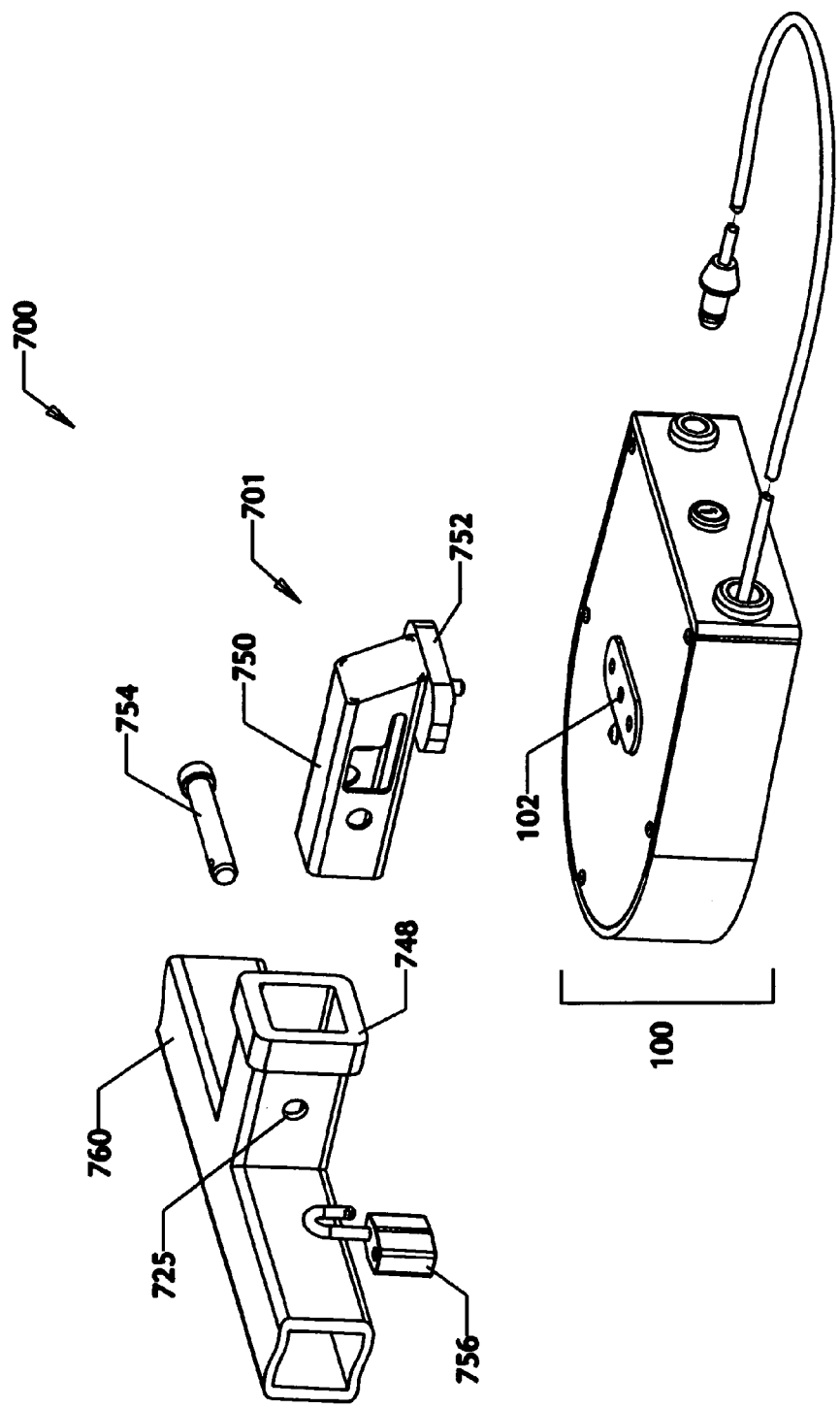

Further referencing FIGS. 6B, 6C, it may be understood that the lower holes 603A, 603B in the lower lip 614 of the coupler may be formed with a tapered entry to allow recess of a tapered head of fastening screws 618A, 618B when seated therein. Thus, the heads of these fastening screws, when fully seated n the holes, will not interfere with receipt of a flange between the upper and lower lips of the coupler. Further, it may be understood that the clearance holes 608A, 608B in upper lip 612 disposed over the lower holes 603A, 603B respectively, may be defined with diameters sufficient for allowing passage of fastening screws 618A, 618B together with an appropriate drive shaft (screw driver, allen wrench, positive-drive, etc.), so as to assist ease of assembly when fastening the coupler to the lockbox.

In other embodiments, referencing FIGS. 7A-8C, a lock assembly 700 may comprise a coupler 701 to mount a lockbox to a receiver 748 associated with a vehicle. Coupler 701 may comprise a square shaped tube 750 and a base plate 752 for engaging a lockbox (e.g., lockbox 100, FIG. 1A, lockbox 300, FIG. 3) to coupler 701. For mounting coupler 701 to a vehicle, the elongate square-shaped tube 750 defined by walls 814A-814D (FIG. 8C) may be inserted and fastened to a receiver hitch associated with a vehicle. That is, the periphery of the walls 814A-814D may fit the inner opening of such receiver. Two opposite walls 814C, 814D (FIG. 8C) may comprise, respectively, lock holes 823A, 823B that may further align with a pair of corresponding holes 725 (FIG. 7B) in the walls of receiver 748. Further, all the aligned holes may be shaped and positioned to allow insertion of a lock pole 754 (FIG. 7B) therethrough to fasten and/or lock the square shaped tuber 750 of coupler 701 within receiver 748.

In a particular embodiment, lock pole 754 may comprise an aperture to allow insertion of a lock 756 of any suitable type. Holes 823A, 823B, lock 756, and locking pole 754 may in combination be viewed as defining cooperatively at least a portion of a locking mechanism. Alternative locking mechanisms may be used (e.g., using differently positioned holes and different types or numbers of locking fasteners) as may be known in the art of hitching assemblies for securing tubular member 750 within receiver 748.

In a possible further embodiment, base plate 752 of the coupler may define a seating surface to assist stable annexation with a plateaued surface (e.g., surface 116 of FIG. 1A) defined by a protrusion of a lockbox. Further, base plate 752 may comprise a passage (not shown) operable to be aligned with a passage (not shown) in tubular member 750, which may further align with a corresponding hole (e.g., central hole 102, FIG. 7B) in the plateaued surface 116. The three aligned holes may, operable together, allow insertion of bolt 861 to fasten and/or secure coupler 701 to a lockbox (e.g., lockbox 100/300, FIG. 1A, 3).

Figure 8A:
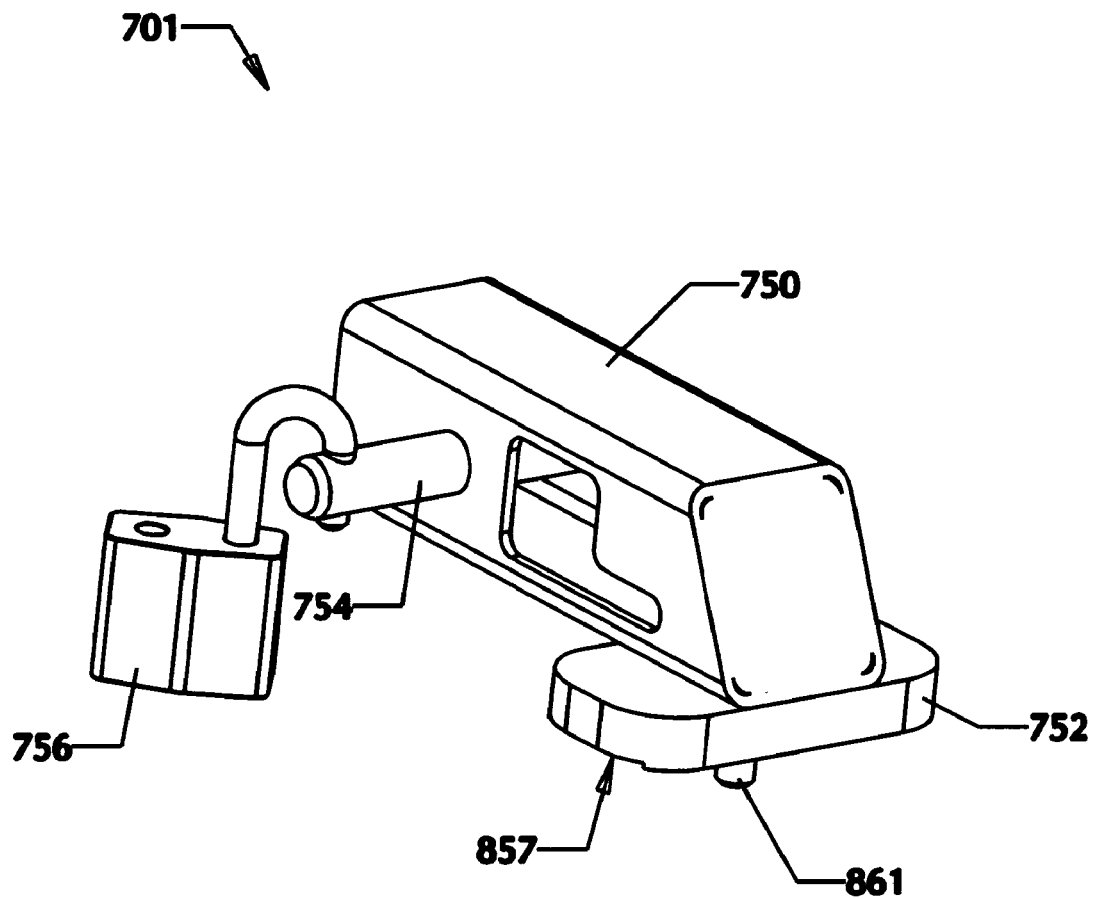
FIGS. 8A-8C are additional views of the coupler of FIGS. 7A and 7B, showing a chassis with a seating surface, a locking mechanism, and a mating mechanism of the coupler, operable together to secure a lockbox to a portion of a vehicle, according to an embodiment of the present invention.
Figure 8B:
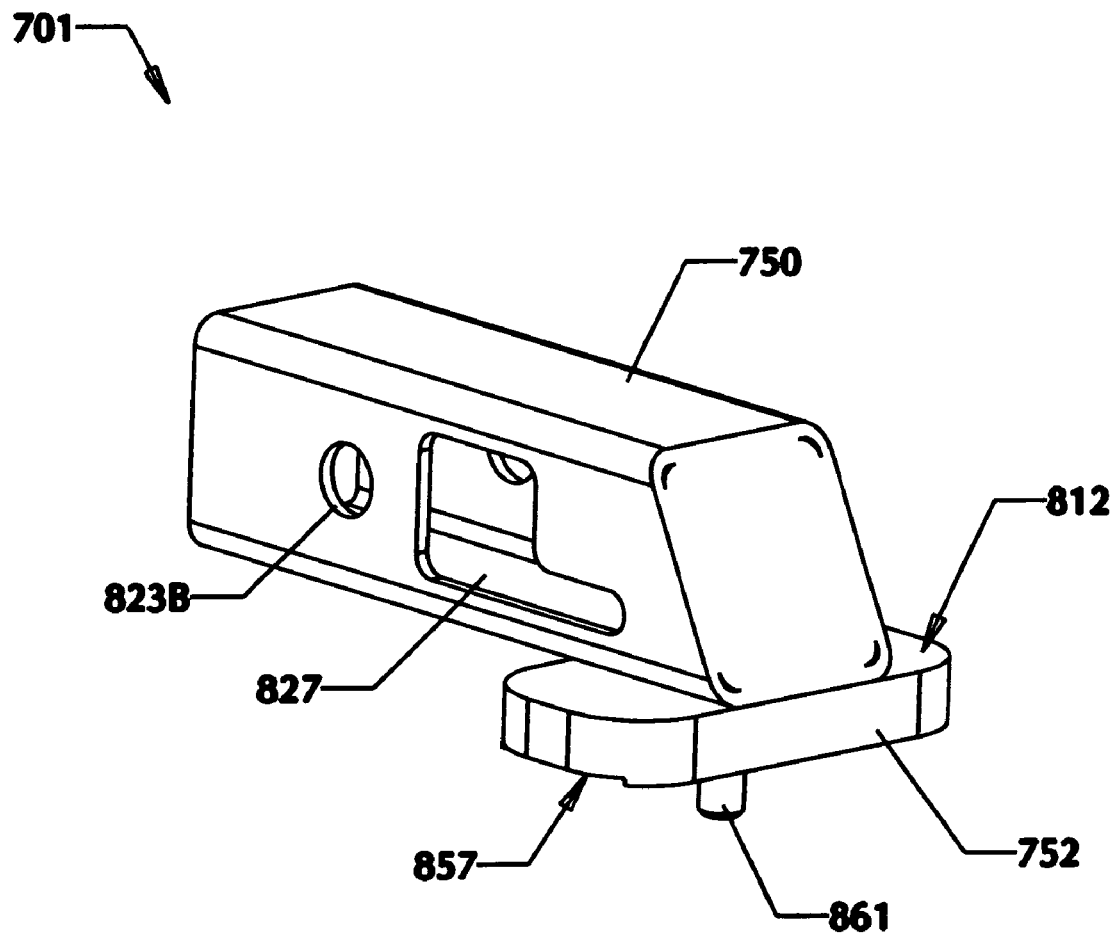
Figure 8C:
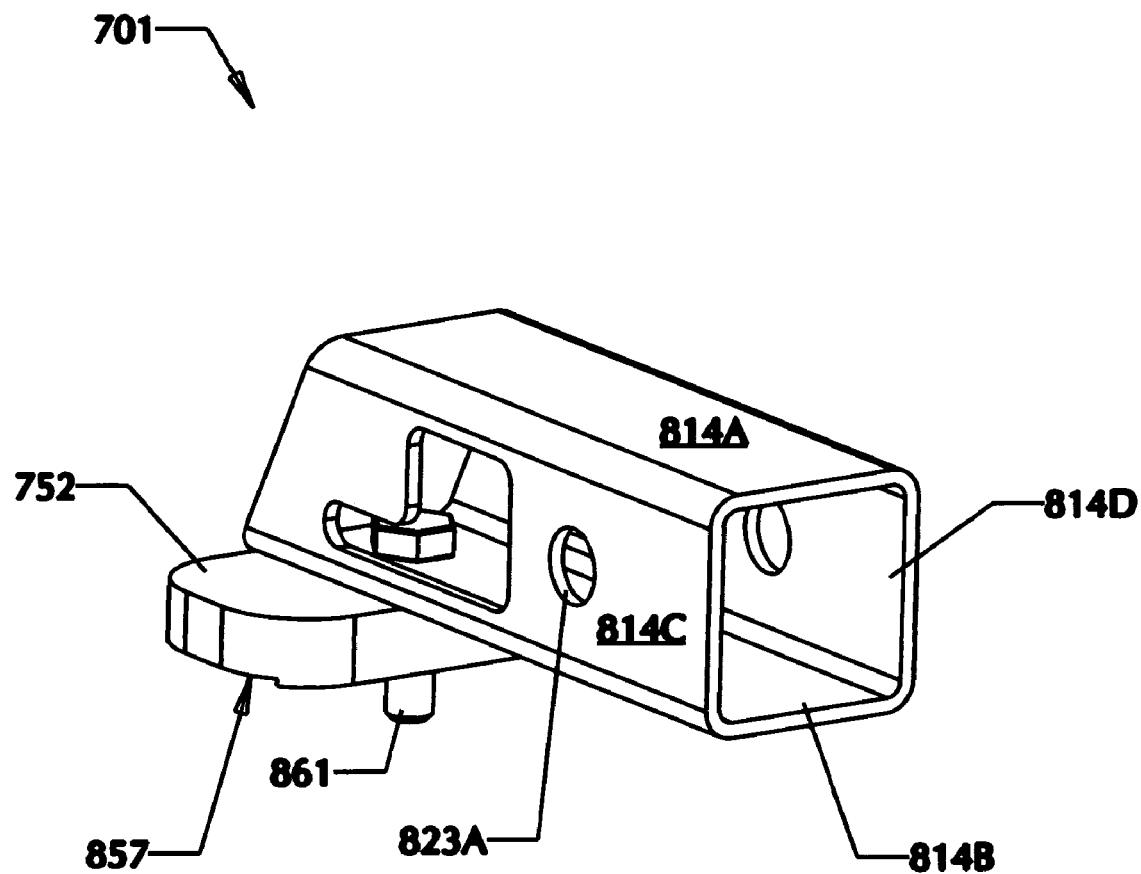
Figure 9A:
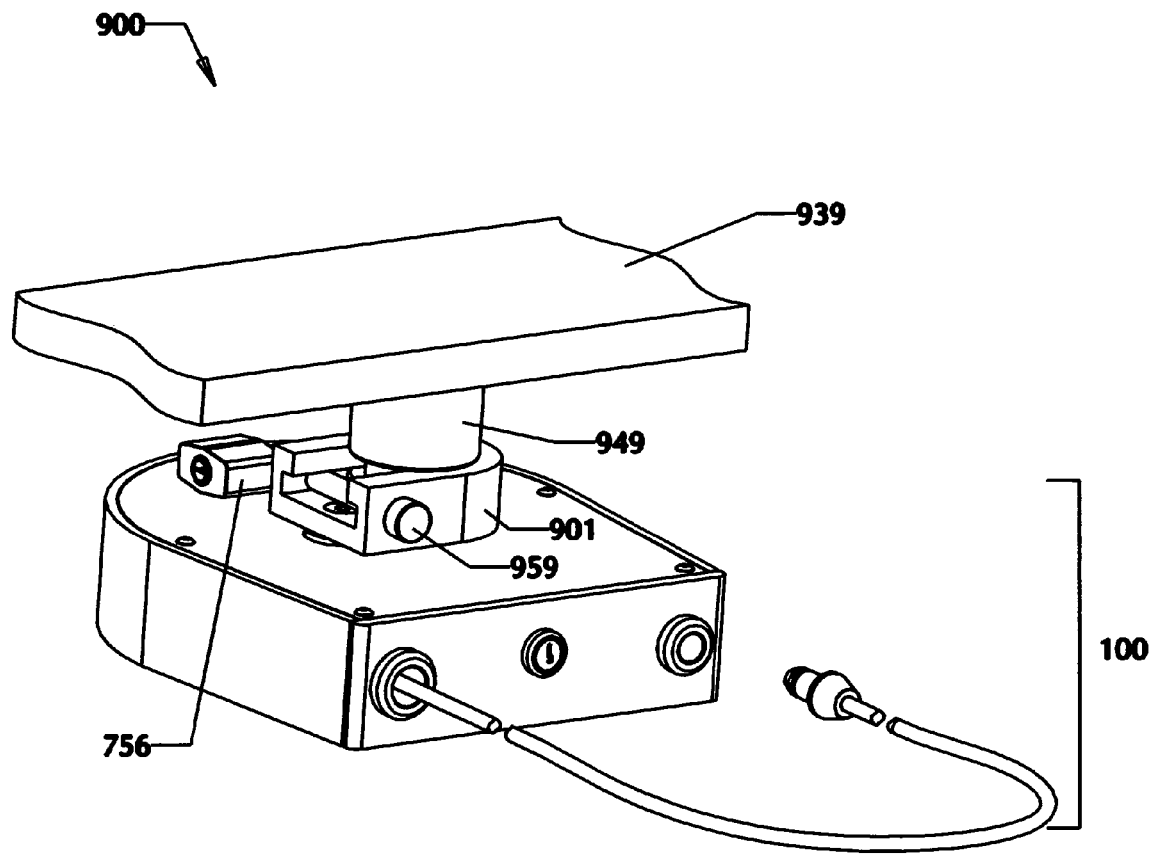
FIGS. 9A and 9B are simplified perspective and assembly views of another coupler, consistent with further embodiments of the present invention, operable to couple a lockbox to a locking pole associated with a fifth wheel trailer.
Figure 9B:
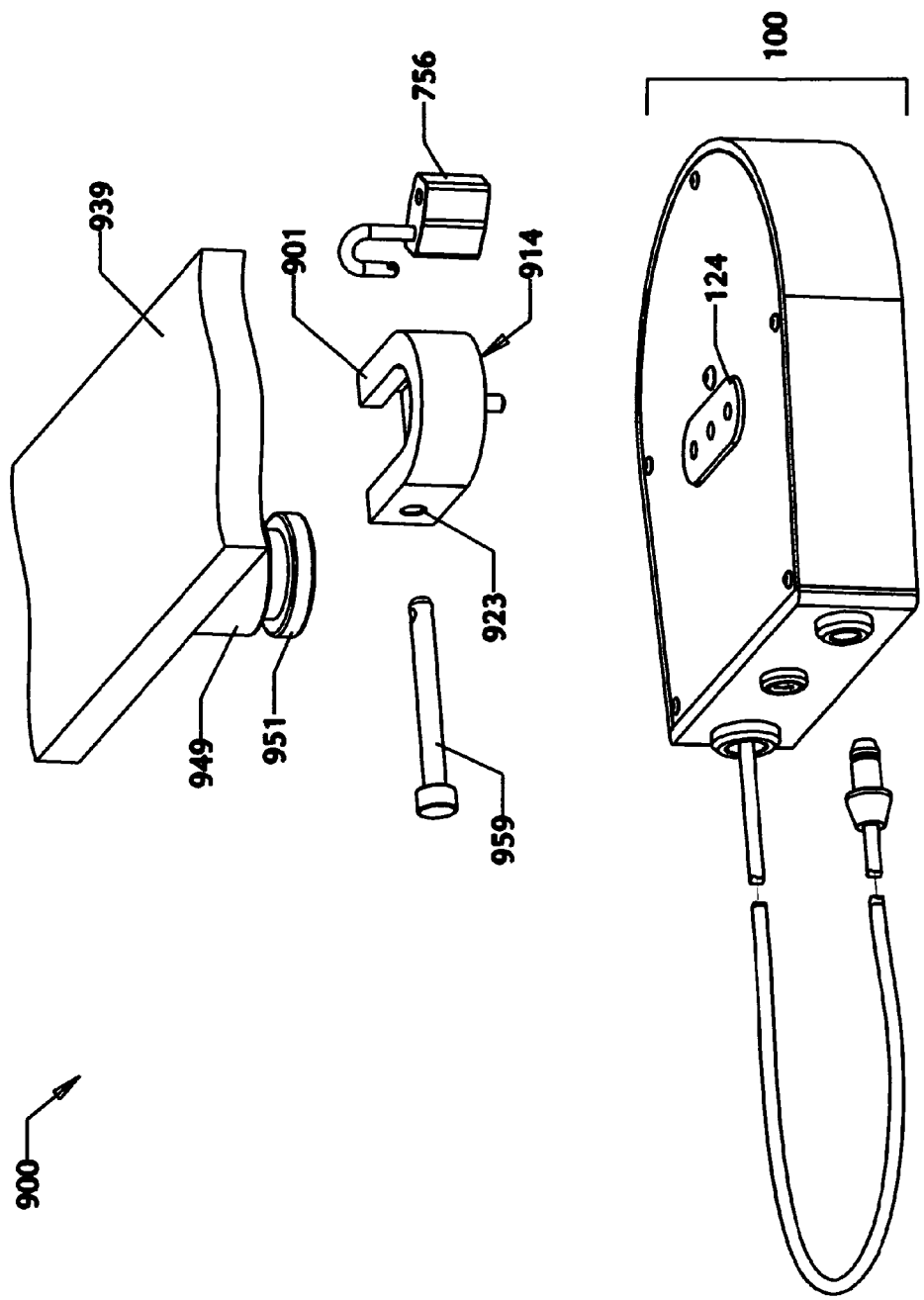

Referencing FIGS. 8A-8C, in some embodiments, sidewalls 814C, 814D of tubular member 750 may further comprise access opening(s) 827A (827B) for enabling access to the hollowed inner diameter of the tubular member 750. Access openings 827A, 827B may provide an access for enabling insertion of locking fastener 861 into the aligned passages through base plate 752 and into a tapped hole 102 of the lockbox 100/300. When tubular member 750 is within receiver 748, walls of the receiver may cover access holes to render fastener 861 inaccessible. As may be understood, the locking mechanism may further guard access to fastener 861, within lock pole 754 may first require unlocking for enabling release of the tubular member 750 to allow exposure of access openings through which the fastener 861 may be reached to enable decoupling of coupler 701 from the lockbox.

Referencing FIGS. 8A-8C, base plate 752 may comprise upper surface 812 and a seating surface that may define slot 857 to fit the periphery of a plateaued surface 116 of a protrusion 124 of the lockbox (e.g., lockbox 100/300, FIGS. 1A, 3). Again, a fastener 861 (e.g., bolt, locking bolt, lock pin etc.) and may extend through a passage defined through the base plate 752 and into the protrusion of the lockbox that defines the plateaued surface, which may be operable to bind these pieces together.

In a possible embodiment where base plate 752 and tubular member 750 may be cast or welded as a unitary structure, aligned holes therein may be a single passage in the structure and there may be no need to use a fastener to bind the base plate 752 to the tubular member 750. In such embodiments, the fastener through the single passage may instead bind the unitary structure of coupler 701 to lockbox 100/300.

Moving forward with reference to FIGS. 9A-10B, in another embodiment, a lock assembly 900 may comprise a U-shaped coupler 901 to mount a lockbox 100/300 to a lock pole 949 as may be associated with a fifth wheel trailer 939. In a particular embodiment, coupler 901 may comprise a lower portion 1014 and an upper portion 1012, which may be partially connected at their periphery by a sidewall 1015. Top member 1012 may define an inward shoulder 1016B operable together with lower member 1014 and sidewall 1015 to slot a flared end 951 to lock pole 949.

Lower member 1014 may comprise upper and lower surfaces, being substantially parallel to each other and substantially symmetrical about a central axis that may bisect both top and lower members. In some embodiments, the shoulder 1016B may further be captured within a slot or groove that may be defined coaxially around the bar of lock pole 949. This may further assist stable capture of the locking pole by coupler 901. Further, the bottom surface 914 (FIG. 9B) of the fifth wheel coupler 901 may be contoured to define the seating surface to seat the plateaued surface and outline defined by the protrusion 124 of the lockbox 100/300. This may serve to further stabilize the securement of the lockbox to the fifth wheel trailer. In other embodiments, bottom surface 914 may be flat but positioned to be attachable to the upper surface of the lockbox.

Partially connecting top member 1012 to lower member 1014, the U-shaped sidewall 1015 may, if examined per a cross-sectional view, comprise two opposing sidewall portions substantially symmetrical about the central axis. Further, the sidewall portions may respectively comprise aligned cross holes 923, opposite each other across the width defined by the upper/lower members and the sidewall. In yet a further embodiment, the sidewall holes may be substantially identical in size and shape, both parallel to upper surface 1016B of lower member 1014, and may be positioned to allow insertion of fastener 959 (e.g., lock pin, bolt, etc.) through the aligned holes.

Lock pole 949 may comprise a metal post (e.g., pole, cylinder, etc.) with a groove operable to interface fastener 959. Top member 1012, sidewall 1015, and bottom member 1014 may collectively be shaped to fit a partial periphery of lock pole 949 so that coupler 901 may be readily coupled to lock pole 949.

Figure 10A:
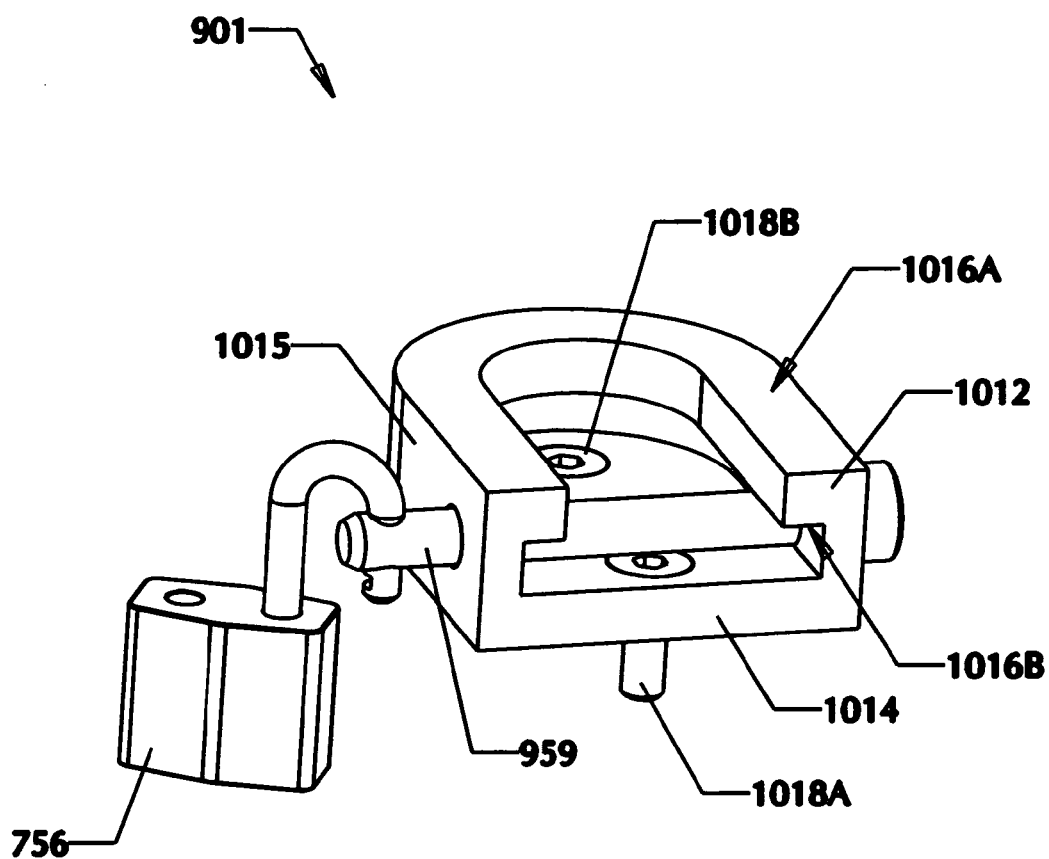
FIGS. 10A and 10B are additional perspective and assembly views of the coupler of FIGS. 9A and 9B, showing a locking mechanism and a mounting mechanism of the coupler.
Figure 10B:
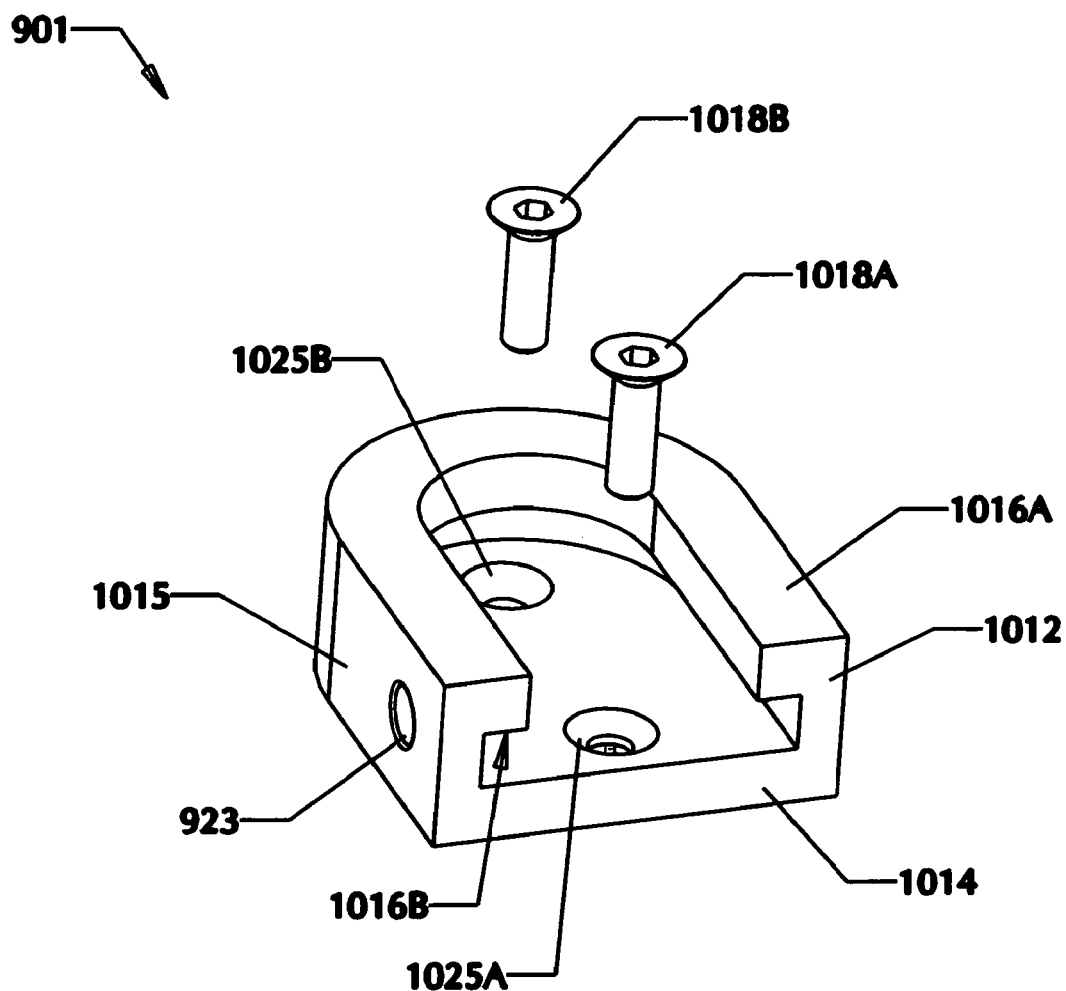
Figure 11A:
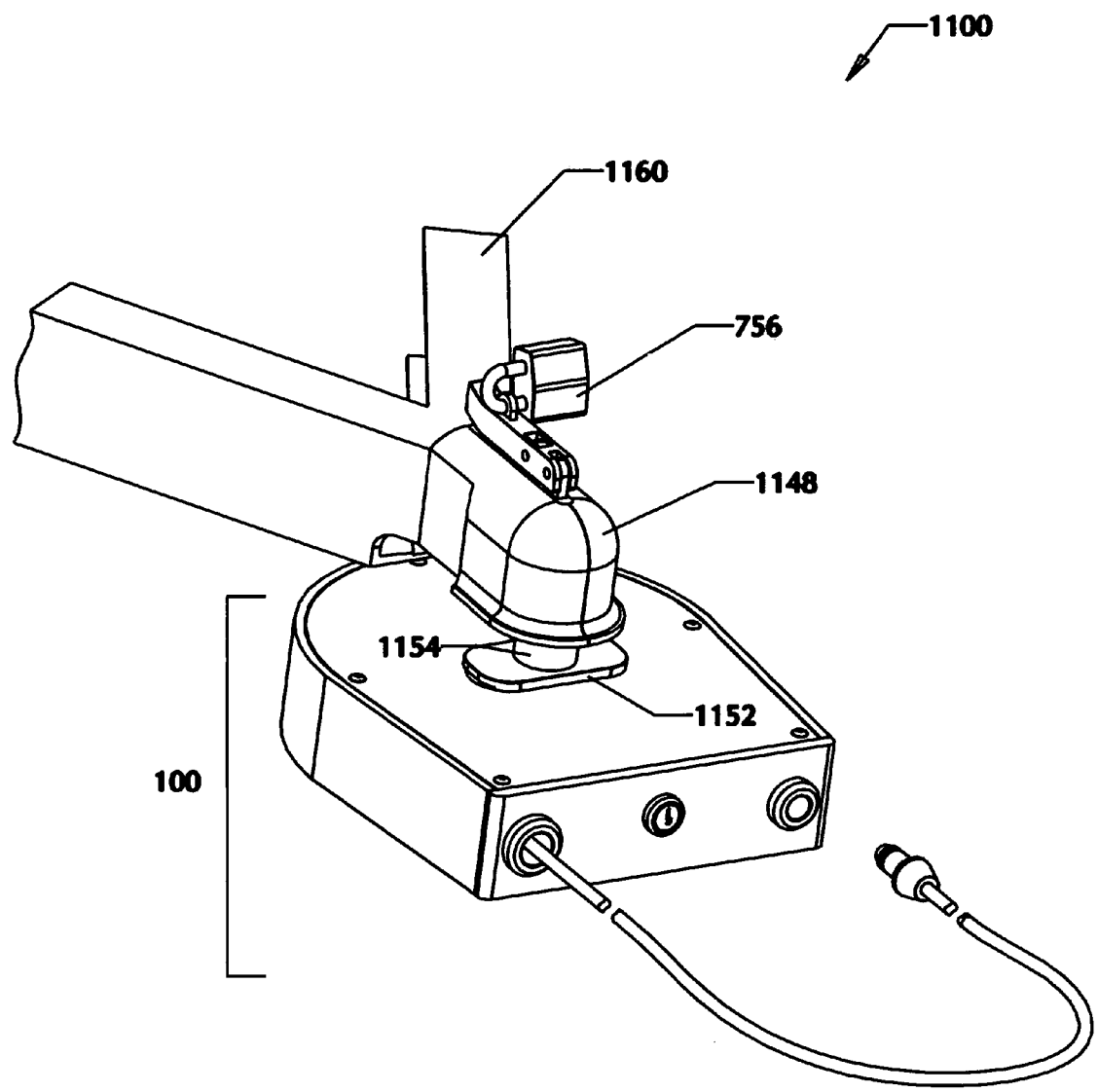
FIGS. 11A and 11B are simplified perspective and assembly drawings of yet another coupler, consistent with some embodiments of the present invention, operable to mount a lockbox to a trailer hitch.
Figure 11B:
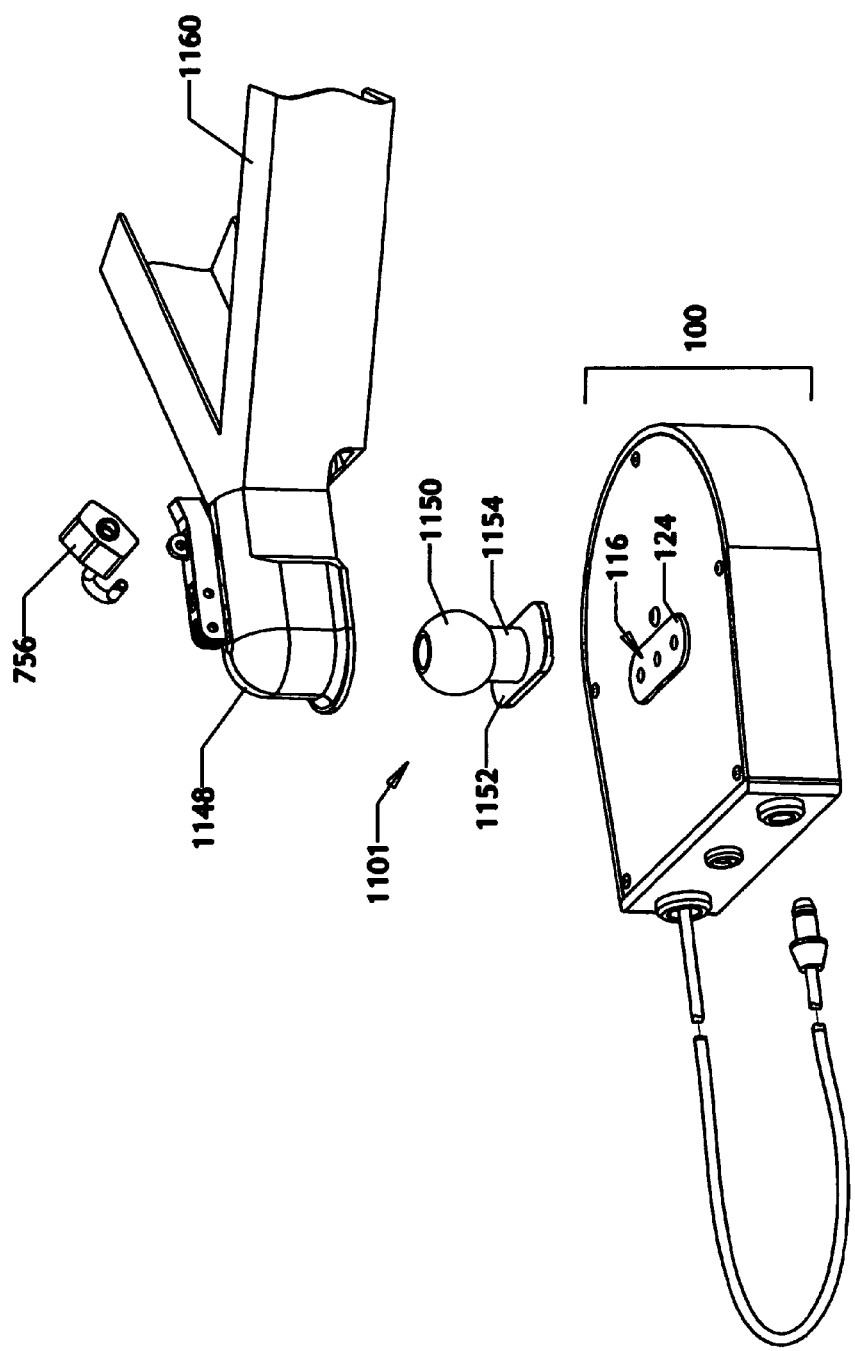

In some embodiments, referencing FIG. 10B, lockbox 100/300 may be locked to lock pole 949 by a locking mechanism, e.g., countersunk bolts 1018A, 1018B that may fit through holes 1025A, 1025B defined in lower member 1014 of coupler 901. Both countersunk holes may be substantially perpendicular to the upper surface of lower member 1014 and extending through its thickness. The pair of holes 1025A, 1025B may further align with holes 103A, 103B (FIG. 1A/3) defined in plateaued surface 116 and operable together to allow insertion of the pair of countersunk bolts 1018A, 1018B. The presence of lock pole 949, fastener 959, and a lock (e.g., lock 756) of any suitable type may be operable to block access to the bolts and therefore block access to the fastening of the coupler to lockbox 100/300 without first unlocking and removing fastener 959 and then removing lock pole 949 from coupler 901.

The combination of countersunk holes 1025A/B in coupler 901, the center hole 102 (FIG. 1A/3), and a pair of countersunk bolts therethrough may be described collectively as a locking mechanism. The combination of lock pole 949, sidewall holes 1025A/B, and lock pin 959 inserted therethrough may be described collectively as another locking mechanism.

In other embodiments of the present invention, referencing FIGS. 11A-12B, a lock assembly 1100 may comprise a ball coupler 1101 to mount a lockbox to a trailer hitch associated with a vehicle. Coupler 1101 may comprise a mating unit comprising a ball 1150 joined by an intermediate a cylindrical neck 1154 to a base plate 1152. In operation, referencing FIG. 11B, ball 1150 may be partially hemispherically secured within a ball receiving unit 1148 to, e.g., a trailer hitch, which may be operable to bind and/or lock coupler 1101 thereto. Further, ball 1150 may comprise an inner cylindrical passage 1264 that may extend therethrough. Passage 1264 may extend through both the ball 1150 and the cylindrical neck 1154 and may further align with passage 1266 defined in base plate 1152. The passages may be aligned to a tapped hole of the protrusion of the lockbox to allow insertion of a locking fastener 1261 (e.g., bolt, pin, etc.) to bind them together.

Figure 12A:
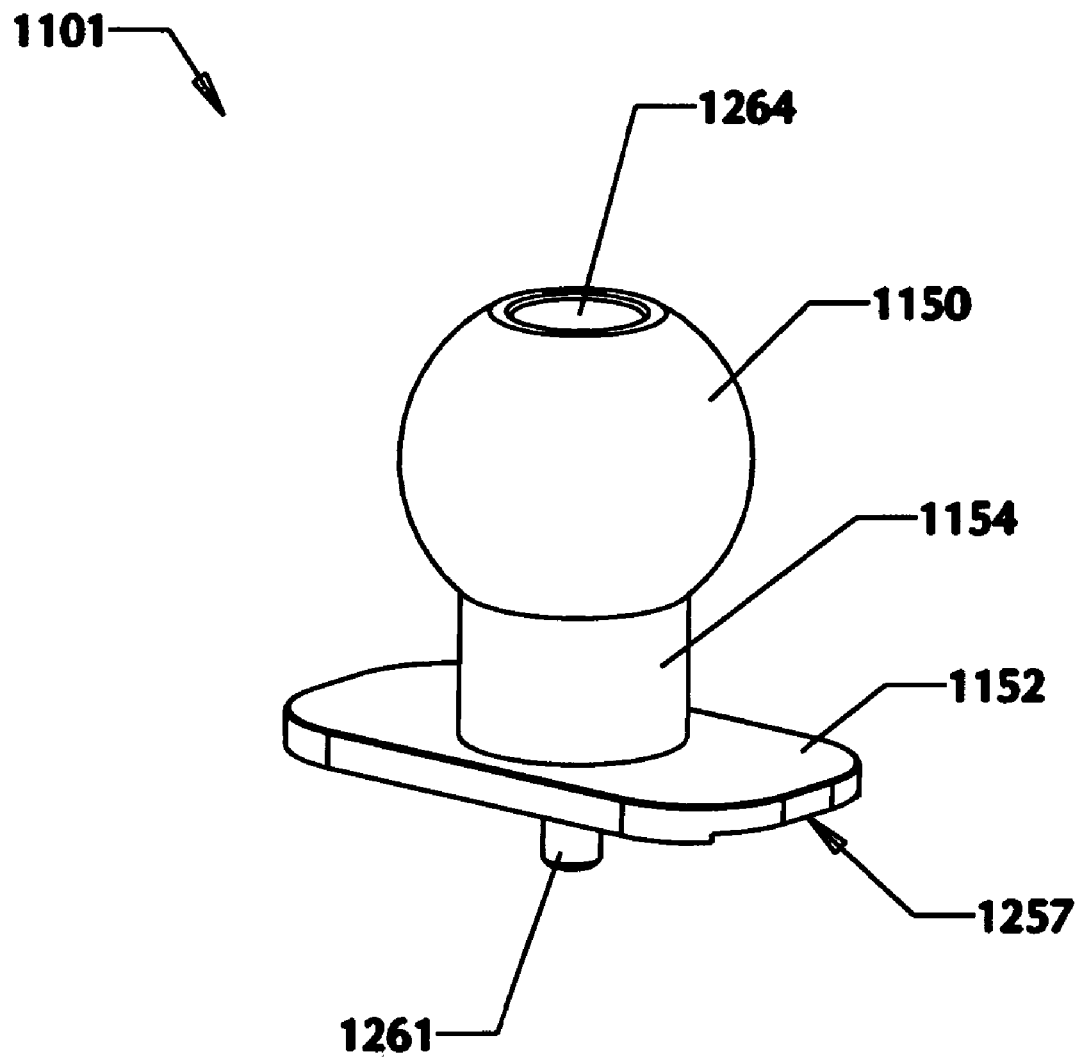
FIGS. 12A and 12B are additional perspective and assembly views of the coupler of FIGS. 11A and 11B, showing provision for a seating surface and a mounting mechanism defined in part by a base and a ball-shaped mating unit operable to be coupled to a receiving unit of a trailer hitch.
Figure 12B:
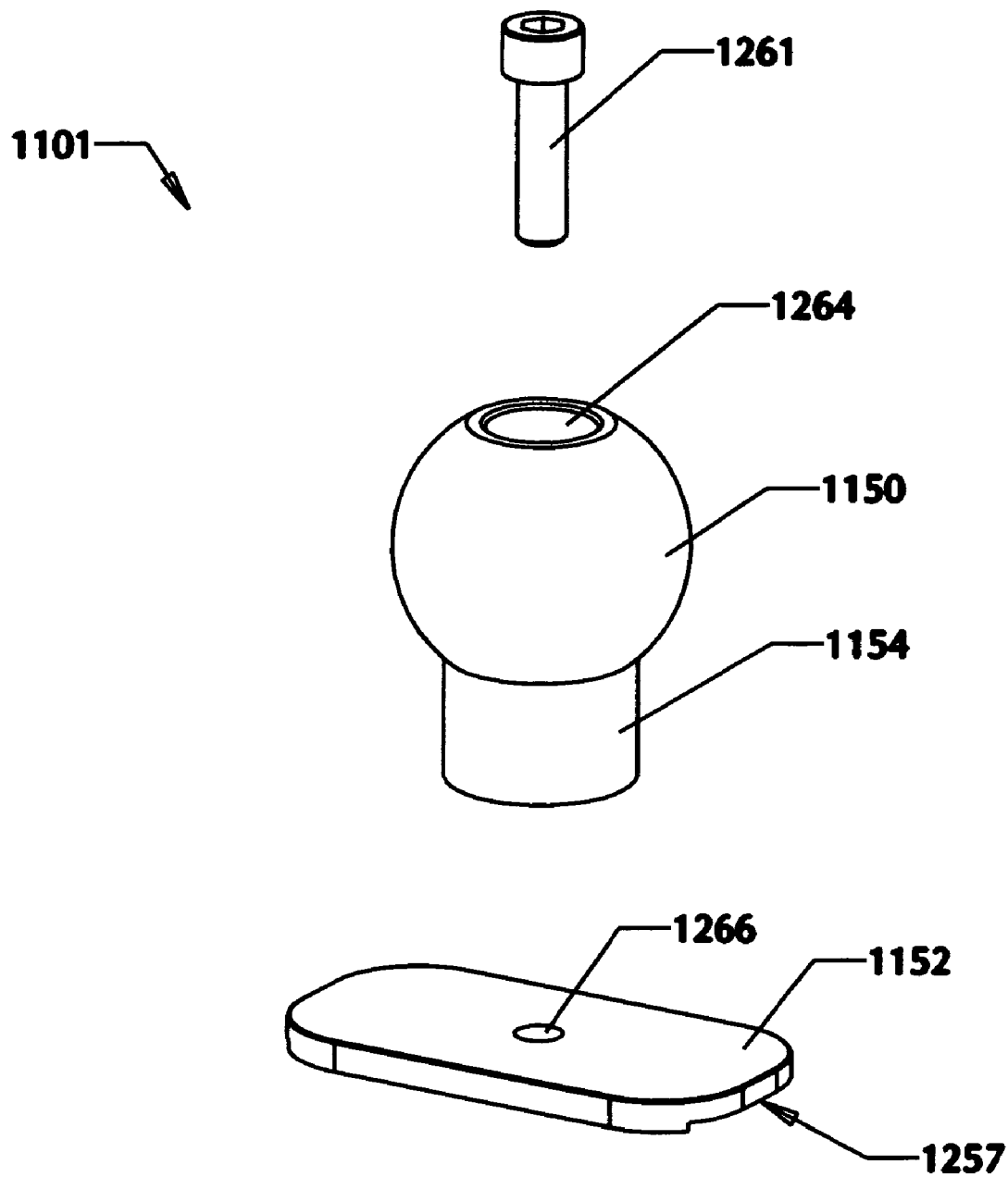

Further referencing FIGS. 12A, 12B, base plate 1152 may be similar to base plate 752 as described previously relative to FIGS. 8A-8C, and may comprise a seating surface to assist stable annexation with a plateaued surface 116 and otherwise may be defined by the protrusion 124 of lockbox 100/300. In some embodiments, the contoured seating surface may further assist alignment of the passage to the tapped hole in the plateaued surface 116. When so aligned, fastener 1261 may extend therethrough and tread within and/or secure coupler 1101 to the lockbox. In operation, ball 1150 may be inserted into ball receiving unit 1148 so that the presence of ball receiving unit 1148 may block access to fastener 1261. Further, ball receiving unit 1148 may comprise a lock mechanism (e.g., a hinge, a shackle, etc) operable to receive a lock (e.g., lock 756) of any suitable type to make fastener 1261 further inaccessible and the lockbox irremovable without first unlocking the lock unit and detaching coupler 1101 from trailer hitch 1160.

In a particular embodiment, ball 1150, cylindrical neck 1154, and base plate 1154 may define a unitary coupling structure, while in other embodiments they may be separate members removably affixed together to form a ball-hitch coupler.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention as may be set forth in the following claims.

What is claimed is:

1. A vehicle mountable retractable cable device, comprising:
   walls defining a housing with an aperture;
   a reel operatively disposed in the housing for spring-biased rotation;
   a cable threaded through the aperture of the housing, the cable having a first end secured to the reel and a second end external the housing terminated by a head of dimension greater than a diameter of the aperture; and
   ratchet operable in cooperation with the reel to enable ratcheted rotation of the reel in a first direction during user extraction of the cable from the housing;
   wherein the ratchet is further operable at periodic intervals of the ratcheted rotation of the reel to enable, when at said periodic intervals, optional reversal of reel rotation from the first direction to a second direction opposite the first by the user relieving the cable of tension to cease cable extraction and for enabling the reel spring-biased retraction of the cable.

2. The device of claim 1, in which the head comprises:
   a butt-end that joins the cable with an angled flare-out operable to removably seat with non-binding engagement a tapered opening defined by the aperture; and
   a distal portion of the head that extends from the butt-end away from the cable defining an opening therethrough of breadth sufficient to allow insertion of an arm of a locking device for enabling operable securement of the second end.

3. The device of claim 2, further comprising a fixture disposed on a first wall of the walls for the cable housing, wherein the fixture defines an opening of diameter and/or width sufficient to allow passage of at least one of (i) an arm of a locking device or (ii) the distal portion of the head when it is operative as a mating head relative the opening.

4. The device of claim 2, further comprising a power spring configured to apply a rotational force on the reel operable to enable retrievable winding and tensioned unwinding of the cable about the reel, the power spring having a pre-bias of magnitude sufficient to hold the tapered shoulder associated with the butt-end of the cable within the tapered opening defined by the aperture when the cable is retrieved.

5. A vehicle mountable retractable cable device, comprising:
   walls defining a housing with an aperture;
   a reel operatively disposed in the housing for spring-biased rotation;
   a cable threaded through the aperture of the housing, the cable having a first end secured to the reel and a second end external the housing terminated by a head of dimension greater than a diameter of the aperture; and
   ratchet operable in cooperation with the reel to enable ratcheted rotation of the reel in a first direction during cable extraction and further operable at periodic intervals of rotation of the reel to enable reversal of reel rotation for cable retraction, wherein the ratchet comprises:
      a gear wheel disposed on a flange of the reel, the gear wheel having a circumference that comprises a first arc-length defined by a first radius through multiple angular increments between respective plurality of peripheral notches of second radius slightly less than the first radius, wherein the multiple angular increments and the plurality of peripheral notches extend through the first arc-length of the circumference, the circumference further comprising a second arc-length defined by a third radius less than the second radius through a given angular extend for the neutral zone, the second arc-length for the neutral zone is of an angular continuum about the circumference that is outside that for the first arc-length; and
      a ratchet lever biased to pivotally press against portions of the gear wheel of the first and second radius to the first arc-length of the circumference during rotation of the reel for extraction of the cable, and operatively configured to prevent rotation of the reel in the reverse direction when capturing a notch of the gear wheel upon ceasing cable extraction and when the reel rotational position presents the first arc-length portion of the circumference to the ratchet lever;
      the third radius of the neutral zone of the gear wheel of magnitude sufficiently less than the first and second radius to enable pivotal clearance of the ratchet lever when it is disposed therein and to enable a change in the direction of rotation of the reel upon ceasing cable extraction with the reel rotation presenting the first arc-length portion of the circumference to the ratchet lever.

6. A vehicle-mountable personal property securement device comprising:
   a housing defined in part by a plurality of walls;
   a coupler disposed on a given wall of the plurality, the coupler defining a mounting mechanism operable to assist mounting of the housing to a portion of a vehicle;
   a reel operatively secured to at least one of the plurality walls for enabling axial rotation within an interior of the housing;
   a cable having first and second ends, wherein the first end of the cable is secured to the reel and the reel is operable by rotation to enable winding/unwinding of a length of the cable;
   a power spring to apply a rotational force on the reel to enable retrievable winding and tensioned unwinding of the cable about the reel;
   a sidewall of the plurality of walls for the housing defining a cable exit orifice, the cable passably threaded through the cable exit orifice; and
   a head fastened to the second end of the cable external the housing, the head comprising at least a portion of width greater than the diameter of the cable exit orifice, wherein the head comprises:
      a butt-end that joins the cable to define a shoulder relative the cable with a radial angled flare-out operable to removably seat with non-binding engagement a tapered seat defined by the cable exit orifice, and
      a tab portion that extends from the butt-end longitudinally away from the cable, the tab portion defining a slot therethrough of a diameter or width sufficient to allow passage of at least one of (i) an overlap, folded portion of the cable or (ii) an arm of a locking device; and
   wherein the shoulder of the head is shaped with the angled radial flare-out operable to removably seat within the tapered seat of the cable exit orifice; and
   the power spring comprises a pre-bias for the rotational force applied to the wheel of magnitude sufficient to seat and hold the shoulder of the head against the tapered seat of the cable exit orifice when the cable is fully retracted under tensioned bias of the power spring;
   in which the coupler is defined at least in part by a clam-shaped clamp that comprises:
      a top portion of given thickness between an outwardly facing surface and an inwardly facing surface, the top portion further comprising a union region along at least a portion of a peripheral side;
      a bottom portion of given thickness between a bottom surface and an inwardly facing surface, the bottom portion further comprising a union region along at least a portion of a peripheral side; and
      a sidewall portion interconnecting the top portion and the bottom portion along their respective union regions;
      wherein at least a portion of the bottom surface defines a seating surface to meet the given wall of the housing; and
      the inwardly facing surface of the bottom portion is disposed in opposing spaced relationship relative to the inwardly facing surface of the top portion as defined by the sidewall portion, the spacing therebetween of magnitude sufficient to receive at least a portion of a flange of a frame, chassis or body of a vehicle.

7. The lock assembly of claim 6, wherein the bottom portion of the clam-shaped clamp defines a hole therethrough substantially perpendicular to the seating surface and operable to align with a corresponding hole in the given wall of the housing;
    said assembly further comprises a fastener threaded through the hole of the lower portion and into that of the given wall and operatively disposed to secure the coupler to the given wall; and
    the upper portion of the clam-shaped clamp defining a clearance hole therethrough of axial alignment relative to the hole in the bottom portion, the clearance hole of diameter sufficiently great for enabling user operable passage of the fastener through the clearance hole and securement of the fastener into the corresponding hole in the given wall when fastening the coupler to the seating surface.

8. The lock assembly of claim 7, in which the top portion further defines a tapped hole laterally offset relative to the clearance hole, and said assembly further comprises a second fastener shaped to extend and fit through the tapped hole in the top portion and operatively configured to enable user operable tightening therein relative its mount to a flange of the vehicle as the portion thereof for preventing slip of the coupler relative the flange.

9. The lock assembly of claim 8, in which the second fastener is a bolt operatively configured for user operable threaded retention within the tapped hole of the top portion.

10. A vehicle-mountable personal property securement device comprising:
    a housing defined in part by a plurality of walls;
    a coupler disposed on a given wall of the plurality, the coupler defining a mounting mechanism operable to assist mounting of the housing to a portion of a vehicle;
    a reel operatively secured to at least one of the plurality walls for enabling axial rotation within an interior of the housing;
    a cable having first and second ends, wherein the first end of the cable is secured to the reel and the reel is operable by rotation to enable winding/unwinding of a length of the cable;
    a power spring to apply a rotational force on the reel to enable retrievable winding and tensioned unwinding of the cable about the reel;
    a sidewall of the plurality of walls for the housing defining a cable exit orifice, the cable passably threaded through the cable exit orifice; and
    a head fastened to the second end of the cable external the housing, the head comprising at least a portion of width greater than the diameter of the cable exit orifice;
    in which the coupler comprises a base that defines a seating surface that meets the given wall of the housing and the mounting mechanism for the coupler comprises a tube shaped to fit at least partially inside a receiver of a vehicle hitch system as said portion of the vehicle, wherein the tube of the coupler extends substantially laterally from over the top of the base, and the end of the tube that is disposed over and proximate the base is sealed by an end wall;
    the sidewall of the tube over and in common with the base define a hole that extends therethrough from an interior of the tube and through the base, and in alignment with an underlying hole defined in the given wall of the housing; and
    said assembly further comprises a fastener operatively configured with placement through the hole of the base and in fixed relationship within the underlying hole defined by the given wall for fastening the coupler to the housing.

11. The lock assembly of claim 10, in which opposing sidewalls of the tube at an end distal the base each define an orifice, wherein the orifices are disposed in aligned opposing relationship to each other and are operable for alignment with respective pin securement holes of the receiver of the vehicle hitch system when the distal end of the tube is operably seated therein, the orifices being further operable for enabling retention within the receiver when a user inserts a pin collectively through these aligned holes.

12. The lock assembly of claim 11, wherein a sidewall of the tube defines and access window between its distal and proximal ends, the access window operatively configured with an aperture of magnitude sufficient to enable user operative placement of the fastener within the hole of the base and its securement into the hole of the given wall by which to fasten the coupler to the housing, and wherein the midsection of the tube with the access window is sufficiently distal along the length of the tube for enabling protective cover of the access hole by the receiver of the vehicle hitch system when the tube is operably seated for retention therein.

13. A vehicle-mountable personal property securement device comprising:
    a housing defined in part by a plurality of walls;
    a coupler disposed on a given wall of the plurality, the coupler defining a mounting mechanism operable to assist mounting of the housing to a portion of a vehicle;
    a reel operatively secured to at least one of the plurality walls for enabling axial rotation within an interior of the housing;
    a cable having first and second ends, wherein the first end of the cable is secured to the reel and the reel is operable by rotation to enable winding/unwinding of a length of the cable;
    a power spring to apply a rotational force on the reel to enable retrievable winding and tensioned unwinding of the cable about the reel;
    a sidewall of the plurality of walls for the housing defining a cable exit orifice, the cable passably threaded through the cable exit orifice; and
    a head fastened to the second end of the cable external the housing, the head comprising at least a portion of width greater than the diameter of the cable exit orifice;
    in which the coupler comprises:
        a base that defines the seating surface that meets the given wall of the housing;
        a ball as the mounting mechanism for the coupler for user operable placement and capture within a ball receiving unit of a trailer-hitch system as said portion of a vehicle; and
        a bolt extending with length through at least a portion of the ball and the base and in fixed relationship within an underlying hole defined by the given wall.

14. The lock assembly of claim 13, in which the ball and base collectively define an inner cylindrical passage extending therethrough and operable in cooperation with the bolt and the threaded underlying hole of the given wall to enable user threaded securement of the coupler to the housing, and an upper portion of the ball further defines the passage with a beveled recess of recess sufficient to fully seat a head of the bolt therein for enabling clearance of the bolt relative to and when the ball is captured within the ball receiving unit of the trailer-hitch system.

* * * * *